(12) United States Patent
Agarwal et al.

(10) Patent No.: US 7,691,304 B2
(45) Date of Patent: *Apr. 6, 2010

(54) THERMOPLASTIC COMPOSITION, METHOD OF MANUFACTURE THEREOF, AND ARTICLES DERIVED THEREFROM

(75) Inventors: Parminder Agarwal, Evansville, IN (US); Shreyas Chakravarti, Evansville, IN (US); Bernard Schrauwen, Tilburg (NL); Robert van de Grampel, Tholen (NL)

(73) Assignee: Sabic Innovative Plastics IP B.V. (NL)

( * ) Notice: Subject to any disclaimer, the term of this patent is extended or adjusted under 35 U.S.C. 154(b) by 281 days.

This patent is subject to a terminal disclaimer.

(21) Appl. No.: 11/765,027

(22) Filed: Jun. 19, 2007

(65) Prior Publication Data
US 2008/0119596 A1 May 22, 2008

Related U.S. Application Data

(63) Continuation-in-part of application No. 11/562,594, filed on Nov. 22, 2006.

(51) Int. Cl.
*C08G 64/00* (2006.01)

(52) U.S. Cl. ............... 264/176.1; 362/377; 428/113; 428/480; 525/439; 525/446; 525/466; 528/196; 528/271; 528/370

(58) Field of Classification Search ............... 264/208, 264/219, 176.1; 502/208; 525/439, 446; 525/466; 528/196, 198, 271, 370; 362/377; 428/113, 480
See application file for complete search history.

(56) References Cited

U.S. PATENT DOCUMENTS

| | | | | |
|---|---|---|---|---|
| 2,901,466 A | * | 8/1959 | Kibler et al. | 528/288 |
| 4,124,652 A | * | 11/1978 | Quinn et al. | 524/449 |
| 4,746,711 A | * | 5/1988 | Serini et al. | 525/439 |
| 5,202,385 A | * | 4/1993 | Bailly et al. | 525/425 |
| 5,207,697 A | * | 5/1993 | Carusillo et al. | 606/167 |
| 5,310,793 A | | 5/1994 | Freitag et al. | |
| 5,502,119 A | * | 3/1996 | Hamilton | 525/439 |
| 5,681,905 A | * | 10/1997 | Mason et al. | 525/438 |
| 6,066,694 A | * | 5/2000 | Chisholm et al. | 525/67 |
| 6,538,065 B1 | | 3/2003 | Suriano et al. | |
| 6,559,270 B1 | | 5/2003 | Siclovan et al. | |
| 6,572,956 B1 | | 6/2003 | Pickett et al. | |
| 6,583,256 B2 | | 6/2003 | Vollenberg et al. | |
| 6,607,814 B2 | | 8/2003 | Pickett et al. | |
| 6,949,599 B2 | | 9/2005 | Vollenberg et al. | |
| 6,969,745 B1 | | 11/2005 | Tariya et al. | |
| 7,024,704 B2 | | 4/2006 | Gafforio et al. | |
| 7,087,682 B2 | | 8/2006 | Tadros et al. | |
| 7,109,274 B2 | | 9/2006 | Acar et al. | |
| 7,166,687 B2 | | 1/2007 | Venderbosch et al. | |
| 2003/0049369 A1 | * | 3/2003 | Tanaka et al. | 427/162 |
| 2003/0050400 A1 | * | 3/2003 | Suriano et al. | 525/152 |
| 2003/0207123 A1 | * | 11/2003 | Brunelle et al. | 428/423.7 |
| 2004/0028907 A1 | | 2/2004 | Wang | |
| 2004/0142176 A1 | | 7/2004 | Wang | |
| 2004/0220330 A1 | * | 11/2004 | DeRudder et al. | 524/837 |
| 2004/0253428 A1 | | 12/2004 | Wang et al. | |
| 2005/0143532 A1 | * | 6/2005 | Fonseca et al. | 525/439 |
| 2005/0158561 A1 | | 7/2005 | Wang et al. | |
| 2005/0266232 A1 | | 12/2005 | Wang et al. | |
| 2006/0100394 A1 | | 5/2006 | Hale | |
| 2006/0264580 A1 | * | 11/2006 | Mullen | 525/439 |

FOREIGN PATENT DOCUMENTS

| | | | |
|---|---|---|---|
| EP | 0272416 A2 | | 6/1988 |
| EP | 0465924 | * | 1/1992 |
| EP | 0687710 A2 | | 12/1995 |
| EP | 0933395 | * | 8/1999 |
| EP | 1624008 A1 | | 2/2006 |

OTHER PUBLICATIONS

JP 01-271427 English Abstract, Oct. 30, 1989 [online], accessed via the Internet [retrieved on May 11, 2009], URL:<http://www19.ipdl.inpit.go.jp/PA1/cgi-bin/PA1INDEX>.*
ASTM D1003-00; Standard Test Method for "Haze and Luminous Transmittance of Transparent Plastics"; ASTM International, West Conshohocken, PA (Jul. 2000) (6 pages).

* cited by examiner

*Primary Examiner*—David Wu
*Assistant Examiner*—Robert Jones, Jr.
(74) *Attorney, Agent, or Firm*—Cantor Colburn LLP

(57) ABSTRACT

Disclosed herein is a thermoplastic composition comprising a combination of 10 to 80 wt. % of a polyester, more than 0 to 50 wt. % of a polycarbonate, and 10 to 90 wt. % of at least one polyester-polycarbonate copolymer comprising, based on the total weight of the copolymer, 15 to 95 wt. % of arylate ester units, and 5 to 85 wt. % of aromatic carbonate units. Also disclosed is a method of forming the compositions, and articles prepared therefrom, for example transparent covers.

39 Claims, No Drawings

THERMOPLASTIC COMPOSITION, METHOD OF MANUFACTURE THEREOF, AND ARTICLES DERIVED THEREFROM

CROSS-REFERENCE TO RELATED APPLICATION

This application is a continuation-in-part of application Ser. No. 11/562,594, filed Nov. 22, 2006, which is incorporated herein by reference in its entirety.

BACKGROUND OF THE INVENTION

This disclosure relates to a thermoplastic composition, method of manufacture thereof, and articles derived therefrom.

Polyesters can be blended with other polymers to improve various properties of the polyester. Specifically, polyesters can be blended with polycarbonates to provide improved mechanical properties such as impact strength. However, other properties of the polyesters, specifically optical properties, can be adversely affected by such blending. For example, articles formed from polyester-polycarbonate blends can be hazy or colored, with diminished light transmittance.

Another perceived need with respect to polyester-polycarbonate blends is improved weatherability, in particular resistance to degradation by ultraviolet (UV) light. Chemical resistance would also be advantageous, especially resistance to caustic solutions, i.e., aqueous solutions comprising chlorine, bromine, and the like, of the type used in pools and spas. These properties are especially desirable for compositions used to form articles that are exposed to harsh conditions, such as covers for spas, cell phone covers, automotive applications and the like.

There accordingly remains a need in the art for transparent polyester-polycarbonate blends with improved weatherability and/or chemical resistance.

SUMMARY OF THE INVENTION

The above deficiencies in the art are alleviated by a composition, based on the total weight of polymer components in the composition, comprising a transparent blend of (a) from 10 to 80 wt. % of a polyester comprising units of the formula

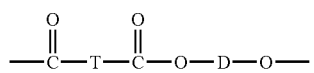

wherein T is a residue derived from a $C_5$-$C_7$ cycloaliphatic or $C_8$-$C_{12}$ aromatic dicarboxylic acid or chemical equivalent thereof, and D is a residue derived from a $C_6$-$C_{12}$ aromatic or $C_2$-$C_{12}$ aliphatic diol or chemical equivalent thereof; (b) from more than 0 to 60 wt. % of a polycarbonate comprising units of the formula

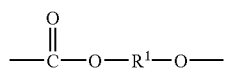

wherein each $R^1$ is independently a divalent organic radical, and at least about 60% of the organic radicals are aromatic; and (c) from 10 to 90 wt. % of at least one polyester-polycarbonate copolymer comprising, based on the total weight of the copolymer, from 15 to 95 wt. % of arylate ester units of the formula

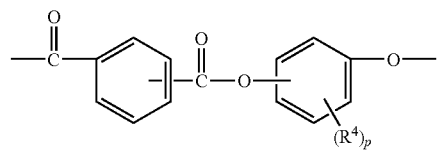

wherein each $R^4$ is independently halogen or $C_{1-4}$ alkyl and p is 0 to 3, and from 5 to 85 wt. % of aromatic carbonate units of the formula

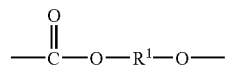

wherein each $R^4$ is independently a divalent organic radical, and at least about 60% of the organic radicals are aromatic, and further wherein the polyester-polycarbonate copolymer comprises terminal groups derived from reaction with a phenolic compound of the formula

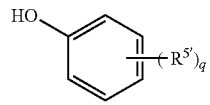

Wherein each $R^{5'}$ is independently halogen, $C_{1-22}$ alkyl, $C_{6-10}$ aryl, $C_{7-22}$ alkylaryl, $C_{7-22}$ arylalkyl, or $C_{1-22}$ alkoxy, and q is 0 to 4.

Also described is a method of manufacture of the compositions described above, comprising melt blending the components of the compositions.

Another embodiment is a method of forming an article, comprising shaping, extruding, blow molding, or injection molding the compositions described above to form the article.

An article is further described, comprising the above-described compositions.

In another embodiment, a composition comprises, based on the total weight of polymer components in the composition, a transparent blend of: (a) from 40 to 80 wt. % of poly(1,4-cyclohexanedimethylene terephthalate)-co-poly(ethylene terephthalate), wherein greater than 50 mol % of the ester groups are 1,4-cyclohexanedimethylene terephthalate groups; (b) from more than 0 to 50 wt. % of a polycarbonate comprising units derived from Bisphenol A; and (c) from 10 to 60 wt. % of at least one polyester-polycarbonate copolymer comprising, based on the total weight of the copolymer, from 85 to 95 wt. % of arylate ester units of the formula

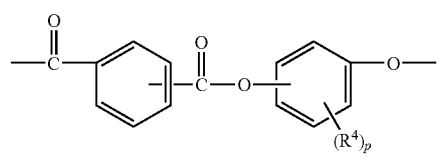

wherein p is 0, and from 5 to 55 wt. % of aromatic carbonate units derived from Bisphenol A, and further wherein the polyester-polycarbonate copolymer comprises terminal groups derived from reaction with a phenolic compound the formula

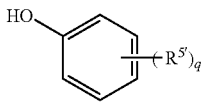

wherein each $R^{5'}$ is independently halogen, $C_{1-22}$ alkyl, $C_{6-10}$ aryl, $C_{7-22}$ alkylaryl, $C_{7-22}$ arylalkyl, or $C_{1-22}$ alkoxy, and q is 0 to 4, wherein a molded article comprising the composition has a haze of less than or equal to 10% and a total luminous transmittance of greater than 80% in accordance with ASTM D1003-00.

In another embodiment, a composition comprises, based on the total weight of polymer components in the composition, a transparent blend of: (a) from 50 to 80 wt. % of poly(1,4-cyclohexanedimethylene terephthalate) (b) from more than 0 to 60 wt. % of a polycarbonate comprising units derived from Bisphenol A; and (c) from 10 to 50 wt. % of at least one polyester-polycarbonate copolymer comprising, based on the total weight of the copolymer, from 85 to 95 wt. % of arylate ester units of the formula

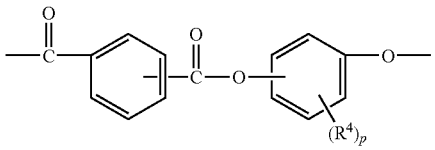

wherein p is 0, and from 5 to 55 wt. % of aromatic carbonate units derived from Bisphenol A, and further wherein the polyester-polycarbonate copolymer comprises terminal groups derived from reaction with a phenolic compound the formula

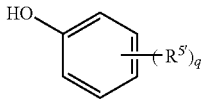

wherein each $R^{5'}$ is independently halogen, $C_{1-22}$ alkyl, $C_{6-10}$ aryl, $C_{7-22}$ alkylaryl, $C_{7-22}$ arylalkyl, or $C_{1-22}$ alkoxy, and q is 0 to 4, wherein a molded article comprising the composition has a haze of less than or equal to 10% and a total luminous transmittance of greater than 80% in accordance with ASTM D1003-00.

The above described and other features are exemplified by the following detailed description.

DETAILED DESCRIPTION OF THE INVENTION

Compositions comprising specific proportions of a polyester, a polycarbonate, and a polyester-polycarbonate copolymer having end groups derived from specific monophenolic compounds, have high transparency, good weatherability, and chemical resistance. In particular, the compositions do not significantly degrade after prolonged exposure to ultraviolet radiation. The compositions also do not significantly degrade after exposure to a caustic solution. Such compositions are therefore useful in the manufacture of lenses and lens covers for pools and/or spas, and cell phones, e.g., cell phone covers.

In addition, it has been unexpectedly found that a composition comprising specific proportions of a polyester, and a polyester-polycarbonate copolymer having end groups derived from specific monophenolic compounds, wherein the presence of a polycarbonate is optional, have good optical properties, weatherability, and chemical resistance.

Compounds are described herein using standard nomenclature. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All ASTM tests are based on the 2003 edition of the Annual Book of ASTM Standards unless otherwise indicated.

Suitable polyesters comprise repeating units of formula (1):

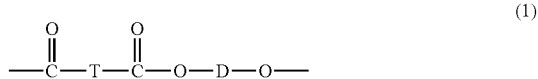

wherein T is a residue derived from a $C_{7-12}$ aromatic or $C_{5-7}$ cycloaliphatic dicarboxylic acid or chemical equivalent thereof, and D is a residue derived from a $C_{6-12}$ aromatic or a $C_{2-12}$ aliphatic diol or chemical equivalent thereof. Examples of aromatic dicarboxylic acids that can be used to prepare the polyester units include isophthalic acid, terephthalic acid, 1,4-naphthalenedicarboxylic acid, 1,5-naphthalenedicarboxylic acid, 2,6-naphthalenedicarboxylic acid, and combinations comprising at least one of the foregoing dicarboxylic acids. Exemplary cycloaliphatic dicarboxylic acids include norbornene dicarboxylic acids, 1,4-cyclohexanedicarboxylic acid, and the like. Chemical equivalents of any of the foregoing diacids include dialkyl esters, e.g., dimethyl esters, diaryl esters, anhydrides, salts, acid chlorides, acid bromides, and the like.

Specific dicarboxylic acids are terephthalic acid, isophthalic acid, naphthalenedicarboxylic acid, 1,4-cyclohexanedicarboxylic acid (cis or trans), or a combination comprising at least one of the foregoing dicarboxylic acids. A specific dicarboxylic acid comprises a combination of isophthalic acid and terephthalic acid wherein the weight ratio of isophthalic acid to terephthalic acid is 91:9 to 2:98.

Suitable $C_{6-12}$ aromatic diols include, but are not limited to, resorcinol, hydroquinone, and pyrocatechol, as well as diols such as 1,5-naphthalene diol, 2,6-naphthalene diol, 1,4-napthalene diol, 4,4'-dihydroxybiphenyl, bis(4-hydroxyphenyl)ether, bis(4-hydroxyphenyl) sulfone, and the like, and combinations comprising at least one of the foregoing aromatic diols.

Exemplary $C_{2-12}$ aliphatic diols include, but are not limited to, straight chain, branched, or cycloaliphatic alkane diols such as ethylene glycol, propylene glycol, i.e., 1,2-and 1,3-propylene glycol, 2,2-dimethyl-1,3-propane diol, 2-ethyl-2-methyl-1,3-propane diol, 1,4-butane diol, 1,4-but-2-ene diol, 1,3-and 1,5-pentane diol, dipropylene glycol, 2-methyl-1,5-pentane diol, 1,6-hexane diol, dimethanol decalin, dimethanol bicyclooctane, 1,4-cyclohexane dimethanol, including its cis- and trans-isomers, triethylene glycol, 1,10-decanediol; and mixtures comprising at least of the foregoing diols. Chemical equivalents of any of the foregoing diols include esters, such as dialkylesters, diaryl esters, and the like. Specific aliphatic diols are cyclohexane dimethanol, ethylene glycol, or a combination comprising cyclohexanedimethanol and ethylene glycol.

In one embodiment, T is derived from cyclohexanedicarboxylic acid, terephthalic acid, isophthalic acid, a chemical equivalent of any of the foregoing, or a combination comprising at least one of the foregoing, and D is derived from 1,4-cyclohexanedimethanol, a $C_{2-4}$ diol, a chemical equivalent of the foregoing, or a combination comprising at least one of the foregoing.

A specific class of polyesters within the scope of formula (1) are the poly(cycloalkylene phthalate)s such as, for example, poly(cyclohexanedimethanol terephthalate) (PCT), having recurring units of formula (2)

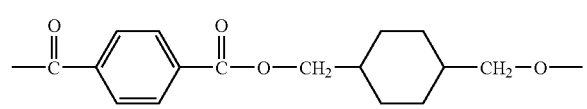

(2)

wherein, according to formula (8), T is derived from terephthalic acid, and D is derived from 1,4-cyclohexanedimethanol.

Another specific class of polyesters within the scope of formula (1) is the poly(cycloalkylene cycloalkanoate)s wherein T and D each contain cycloalkyl groups. In one embodiment, T is derived from cyclohexanedicarboxylic acid and D is a divalent group derived from 1,6-hexane diol, dimethanol decalin, dimethanol bicyclooctane, 1,4-cyclohexane dimethanol and its cis- and trans-isomers, 1,10-decane diol, and the like. A particularly advantageous poly(cycloalkylene cycloalkanoate) is poly(cyclohexane-1,4-dimethylene cyclohexane-1,4-dicarboxylate), also referred to as poly(1,4-cyclohexanedimethanol-1,4-cyclohexanedicarboxylate) (PCCD), having recurring units of formula (3)

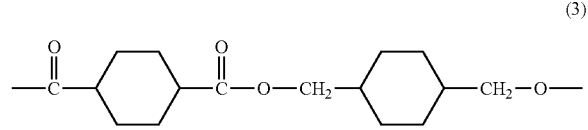

(3)

wherein T is derived from 1,4-cyclohexane dicarboxylic acid and D is derived from 1,4-cyclohexanedimethanol.

Other specific polyesters are copolyesters derived from an aromatic dicarboxylic acid and a mixture of linear aliphatic diols in particular ethylene glycol, butylene glycol, poly(ethylene glycol) or poly(butylene glycol), together with cycloaliphatic diols such as 1,4-hexane diol, dimethanol decalin, dimethanol bicyclooctane, 1,4-cyclohexane dimethanol and its cis- and trans-isomers, 1,10-decane diol, and the like. The ester units comprising the linear aliphatic or cycloaliphatic ester units can be present in the polymer chain as individual units, or as blocks of the same type of units. In one embodiment, polyesters of this type are poly(1,4-cyclohexanedimethylene terephthalate)-co-poly(ethylene terephthalate), known as PCTG when greater than 50 mol % of the ester groups are derived from 1,4-cyclohexanedimethylene terephthalate, or PETG when less than 50 mol % of the ester groups are derived from 1,4-cyclohexanedimethylene terephthalate. In one specific embodiment, the poly(1,4-cyclohexanedimethylene terephthalate)-co-poly(ethylene terephthalate) comprises up to 25 mole percent of a residue derived from a $C_{2-4}$ diol.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). Branched polyester can be used, in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

The polyesters can have an intrinsic viscosity, as determined in chloroform at 25° C., of 0.3 to 2 deciliters per gram, specifically 0.45 to 1.2 deciliters per gram. The polyesters can have a weight average molecular weight of 10,000 to 200,000 Daltons, specifically 20,000 to 100,000 Daltons as measured by gel permeation chromatography.

The polyester is present in the composition in an amount of 10 to 80 weight percent (wt. %), based on the total weight of the composition. Within this range, the amount can be varied to achieve the desired characteristics of the composition, for example low haze and/or high transparency. For example, the polyester can be present in an amount of 12 to 50 wt. %, more specifically 15 to 30 wt. %, based on the total weight of the composition. In other embodiments described herein, the polyester is present in an amount of 30 to 80 wt. %, or 40 to 80 wt. %.

Suitable polycarbonates comprise repeating structural carbonate units of formula (4):

(4)

in which at least 60 percent of the total number of $R^1$ groups contain aromatic organic groups and the balance thereof are aliphatic, alicyclic, or aromatic groups. In an embodiment, each $R^1$ is a $C_{6-30}$ aromatic group, that is, contains at least one aromatic moiety. $R^1$ can be derived from a dihydroxy compound of the formula HO—$R^1$—OH, in particular a dihydroxy compound of formula (5):

HO-$A^1$-$Y^1$-$A^2$-OH    (5)

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (6):

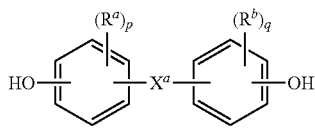

(6)

wherein $R^a$ and $R^b$ each represent a halogen or $C_{1-12}$ alkyl group and can be the same or different; and p and q are each independently integers of 0 to 4. Also in formula (6), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic bridging group can be disposed such that the $C_6$ arylene groups connected thereto are each connected to a common alkylidene carbon or to different carbons of the $C_{1-18}$ organic bridging group. In one embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

Other useful aromatic dihydroxy compounds of the formula HO—$R^1$—OH include compounds of formula (7):

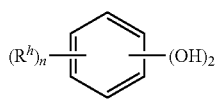

(7)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenyl-methane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-alkyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methylhydroquinone, 2-ethylhydroquinone, 2-propyl hydroquinone, 2-butylhydroquinone, 2-t-butylhydroquinone, 2-phenylhydroquinone, 2-cumylhydroquinone, 2,3,5,6-tetramethylhydroquinone, 2,3,5,6-tetra-t-butylhydroquinone, 2,3,5,6-tetrafluorohydroquinone, 2,3,5,6-tetrabromohydroquinone, and the like, as well as combinations comprising at least one of the foregoing dihydroxy compounds.

Specific examples of bisphenol compounds of formula (6) include 1,1-bis(4-hydroxyphenyl)methane, 1,1-bis(4-hydroxyphenyl)ethane, 2,2-bis(4-hydroxyphenyl) propane (also known as "bisphenol A", "BPA", "bisphenol A", "Bisphenol-A", or "Bisphenol A"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl) cyclohexane (DMBPC). Combinations comprising at least one of the foregoing dihydroxy compounds can also be used. In one specific embodiment, the polycarbonate is a linear homopolymer derived from bisphenol-A, in which each of $A^1$ and $A^2$ is p-phenylene and $Y^1$ is isopropylidene in formula (6).

In one embodiment, the polycarbonates are polysiloxane-polycarbonate copolymers that comprise carbonate units of formula (4) and polysiloxane units of formula (6a) and/or (7a):

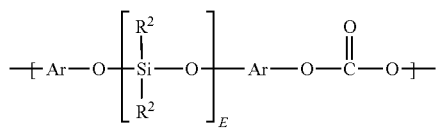

(6a)

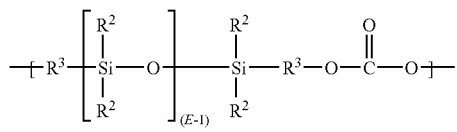

(7a)

wherein each $R^2$ is independently the same or different $C_{1-13}$ monovalent organic group, each Ar is independently the same or different $C_{6-36}$ arylene group wherein the bonds are directly connected to an aromatic moiety, each $R^3$ is independently the same or different divalent $C_{1-30}$ organic group, and E is an integer having an average value of 2 to 1,000.

Specifically $R^2$ can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ arylalkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The Ar groups in formula (6a) can be derived from a $C_6$-$C_{30}$ dihydroxyarylene compound, for example a dihydroxyarylene of formula (6a) or (7a) above. Exemplary dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 11-bis(4-hydroxyphenyl) butane, 2,2-bis(4-hydroxy-1-methylphenyl)propane, 1,1-bis(4-hydroxyphenyl)cyclohexane, bis(4-hydroxyphenylsulfide), and 1,1-bis(4-hydroxy-t-butylphenyl)propane.

The $R^3$ groups in formula (7a) can be a $C_1$-$C_{13}$ alkylene, $C_3$-$C_6$ cycloalkylene, or $C_6$-$C_{14}$ arylene. In one embodiment, each $R^3$ is a group of formula (8):

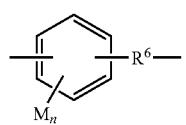

(8)

wherein $R^6$ is a $C_2$-$C_8$ alkylene, each M is the same or different halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, and each n is independently 0, 1, 2, 3, or 4.

The value of E in formulas (6a) and (7a) can vary widely depending on the type and relative amount of each component in the thermoplastic composition, the desired properties of the composition, and like considerations. Generally, E has an average value of 2 to about 1,000, specifically about 2 to about 500, more specifically about 5 to about 100. In one embodiment, E has an average value of about 10 to about 75, and in still another embodiment, E has an average value of about 40 to about 60. Where E is of a lower value, e.g., less than about 40, it can be desirable to use a relatively larger amount of the polycarbonate-polysiloxane copolymer. Conversely, where E is of a higher value, e.g., greater than about 40, it can be necessary to use a relatively lower amount of the copolymer.

In a specific embodiment, the polysiloxane units are of formula (7a) wherein each $R^2$ is independently the same or different $C_{1-3}$ monovalent organic group, each $R^3$ is the same or different divalent $C_{1-10}$ organic group, and E is an integer from 2 to 500. In a specific embodiment, each $R^2$ is the same or different $C_{1-3}$ alkyl or $C_{1-3}$ haloalkyl, each $R^3$ is of formula (8) wherein $R^6$ is the same $C_{1-5}$ alkylene and each M is the same and is bromo or chloro, a $C_{1-3}$ alkyl, $C_{1-3}$ alkoxy, phenyl, chlorophenyl, or tolyl, and E is an integer having an average value of 4 to 100. In still another embodiment, each $R^2$ is methyl, each $R^3$ is of formula (8) wherein $R^6$ is trimethylene, M is methoxy, and n is one. Such polycarbonate-siloxane copolymers are sold commercially by General Electric Company.

Polycarbonates can be manufactured by processes such as interfacial polymerization and melt polymerization as are known in the art. The polycarbonates can have a weight average molecular weight ($M_w$) of about 10,000 to about 200,000 Daltons, specifically about 20,000 to about 100,000 Daltons as measured by gel permeation chromatography, (GPC), using a crosslinked styrene-divinylbenzene column and calibrated to polycarbonate references. GPC samples are prepared at a concentration of about 1 mg/ml, and are eluted at a flow rate of about 1.5 ml/min.

The compositions comprise more than 0 wt. % of the polycarbonate, specifically, more than 0 to 50 wt. % of the polycarbonate, even more specifically 5 to 50 wt. % of the polycarbonate, each based on the total weight of the composition. Within this range, the amount can be varied to achieve the desired characteristics of the composition, for example low haze. For example, the polycarbonate can be present in an amount of 10 to 40 wt. %, more specifically 20 to 35 wt. %, based on the total weight of the composition. In one embodiment, the composition comprises 10 to 40 wt. % of the polysiloxane-polycarbonate copolymer, based on the total weight of the composition.

The composition further comprises a polyester-polycarbonate copolymer, also known as polyester carbonate, copolyester-polycarbonate, and copolyestercarbonate. The polyester-polycarbonate copolymer comprises, based on the total weight of the copolymer, 5 to 95 wt. % of arylate ester units and 5 to 85 wt. % of carbonate units. n a specific embodiment, the polyester-polycarbonate copolymer comprises from 10 to 30 wt. %, or from 15 to 25 wt. % of arylate ester units of formula (9) wherein each $R^4$ is independently a halogen or a $C_{1-4}$ alkyl, and p is 0 to 3, and from 70 to 90 wt. %, or from 75 to 85 wt. % of aromatic carbonate units of the formula (4) in which at least 60 percent of the total number of $R^1$ groups contain aromatic organic groups and the balance thereof are aliphatic, alicyclic, or aromatic groups.

The arylate ester units are of formula (9):

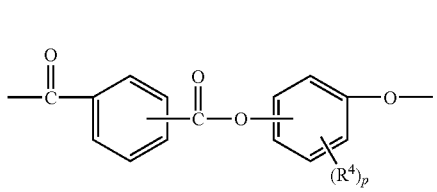

wherein each $R^4$ is independently a halogen or a $C_{1-4}$ alkyl, and p is 0 to 3. The arylate ester units can be derived from the reaction of a mixture of terephthalic acid and isophthalic acid or chemical equivalents thereof with compounds such as 5-methylresorcinol, 5-ethylresorcinol, 5-propylresorcinol, 5-butylresorcinol, 5-t-butylresorcinol, 2,4,5-trifluororesorcinol, 2,4,6-trifluororesorcinol, 4,5,6-trifluororesorcinol, 2,4,5-tribromoresorcinol, 2,4,6-tribromoresorcinol, 4,5,6-tribromoresorcinol, catechol, hydroquinone, 2-methylhydroquinone, 2-ethylhydroquinone, 2-propylhydroquinone, 2-butylhydroquinone, 2-t-butylhydroquinone, 2,3,5-trimethylhydroquinone, 2,3,5-tri-t-butylhydroquinone, 2,3,5-trifluorohydroquinone, 2,3,5-tribromohydroquinone, or a combination comprising at least one of the foregoing compounds.

The aromatic carbonate units in the polyester-polycarbonate copolymer are of formula (4) as described above. Specifically, the carbonate units are derived from a dihydroxy compound of formula (6), specifically a compound of formula (6) wherein $X^a$ is a $C_{1-25}$ alkylidene of the formula $—C(R^c)(R^d)—$ wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula $—C(=R^e)—$ wherein $R^e$ is a divalent $C_{1-12}$ hydrocarbon group, even more specifically Bisphenol-A.

In a specific embodiment, the polyester-polycarbonate copolymer is a poly(isophthalate-terephthalate-resorcinol ester)-co-(bisphenol-A carbonate) polymer comprising repeating structures of formula (10):

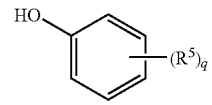

wherein each $R^5$ is independently halogen, $C_{1-22}$ alkyl, $C_{1-22}$ alkoxy, $C_{1-22}$ alkoxycarbonyl, $C_{6-10}$ aryl, $C_{6-10}$ aryloxy, $C_{6-10}$ aryloxycarbonyl, $C_{6-10}$ arylcarbonyl, $C_{7-22}$ alkylaryl, $C_{7-22}$ arylalkyl, $C_{6-30}$ 2-benzotriazole, or triazine, and q is 0 to 5. As used herein, $C_{6-16}$ benzotriazole includes unsubstituted and substituted benzotriazoles, wherein the benzotriazoles are substituted with up to three halogen, cyano, $C_{1-8}$ alkyl, $C_{1-8}$ alkoxy, $C_{6-10}$ aryl, or $C_{6-10}$ aryloxy groups.

Suitable monophenolic chain stoppers of formula (11) include phenol, p-cumylphenol, p-tertiary-butylphenol, hydroxydiphenyl, monoethers of hydroquinones such as p-methoxyphenol, alkyl-substituted phenols including those with branched chain alkyl substituents having 8 to 9 carbon atoms, monophenolic UV absorber such as 4-substituted-2-hydroxybenzophenone, arylsalicylate, monoesters of diphenols such as resorcinol monobenzoate, 2-(2-hydroxyaryl)-benzotriazole, 2-(2-hydroxyaryl)-1,3,5-triazines, and the like. Specific monophenolic chain stoppers include phenol, p-cumylphenol, and resorcinol monobenzoate.

The composition can also include other types of chain stoppers, for example monocarboxylic acid halides, monohaloformates, and the like. Such chain stoppers can be of formula (11), wherein a $—C(O)X$ or $—OC(O)Cl$ group is present in place of the phenolic hydroxyl group, and X is a halogen, particularly bromine or chloride. Monocarboxylic acid chlorides and monochloroformates can be specifically mentioned. Exemplary monocarboxylic acid chlorides include monocyclic, monocarboxylic acid chlorides such as benzoyl chloride, $C_{1-22}$ alkyl-substituted benzoyl chloride, 4-methylbenzoyl chloride, halogen-substituted benzoyl chloride, bromobenzoyl chloride, cinnamoyl chloride, 4-nadimidobenzoyl chloride, and mixtures thereof; polycyclic, mono-

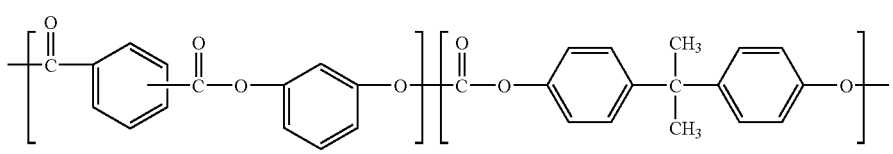

comprising from 10 to 30 wt. %, or from 15 to 25 wt. % of arylate ester units and from 70 to 90 wt. %, or from 75 to 85 wt. % of aromatic carbonate units.

The polyester-polycarbonate copolymer comprises terminal groups derived from the reaction with a chain stopper (also referred to as a capping agent), which limits molecular weight growth rate, and so controls molecular weight in the polycarbonate. The chain stoppers are monophenolic compounds of formula (11)

carboxylic acid chlorides such as trimellitic anhydride chloride, and naphthoyl chloride; and mixtures of monocyclic and polycyclic monocarboxylic acid chlorides. Chlorides of aliphatic monocarboxylic acids with up to 22 carbon atoms are suitable. Functionalized chlorides of aliphatic monocarboxylic acids, such as acryloyl chloride and methacryloyl chloride, are also suitable. Monochloroformates include monocyclic monochloroformates, such as phenyl chloroformate, alkyl-substituted phenyl chloroformate, p-cumylphenyl chloroformate, toluene chloroformate, and mixtures thereof. A combination of different chain stoppers can be used, for example a combination of two different monophenolic chain stoppers or a combination of a monophenolic chain stopper and a monochloroformate chain stopper.

The type and amount of chain stopper used in the manufacture of the polyester-polycarbonate copolymers are selected to provide copolymers having an $M_w$ of 1,500 to 100,000 Daltons, specifically 1,700 to 50,000 Daltons, and more specifically 2,000 to 40,000 Daltons. Molecular weight determinations are performed using gel permeation chromatography, using a crosslinked styrene-divinylbenzene column and calibrated to bisphenol-A polycarbonate references. Samples are prepared at a concentration of 1 milligram per milliliter, and are eluted at a flow rate of 1.0 milliliter per minute.

The polyester-polycarbonate copolymers are present in the composition in an amount of 10 to 90 wt. %, based on the total weight of the composition. Within this range, the amount can be varied to achieve the desired characteristics of the composition, for example low haze. For example the polyester-polycarbonate copolymers can be present in an amount of 15 to 60 wt. %, or more specifically 15 to 45 wt. %, based on the total weight of the composition.

In addition to the polycarbonates, polyesters, and polyester-polycarbonate copolymers, the composition can include various other additives ordinarily incorporated with compositions of this type, with the proviso that the additives are selected so as not to significantly adversely affect the desired properties of the composition. Mixtures of additives can be used.

Suitable additives include a quencher such as an acid interchange quencher, a compound having an epoxy functionality, an antioxidant, a heat stabilizer, a light stabilizer, an ultraviolet light absorber, a plasticizer, a mold release agent, a lubricant, an antistatic agent, a pigment, a dye, a flame retardant, a gamma stabilizer, or a combination comprising at least one of the foregoing additives. Each of the foregoing additives, when present, is used in amounts typical for polyester-polycarbonate blends, for example 0.001 to 5 wt. % of the total weight of the blend, specifically 0.01 to 2 wt. % of the total weight of the blend, except for flame retardants, which are more typically used in amounts of 1 to 10 wt. %, based on the total weight of the composition.

Exemplary quenchers include zinc phosphate, monozinc phosphate, phosphorous acid, phosphoric acid diluted in water, sodium acid pyrophosphate, tetrapropylorthosilicate, tetrakis-(2-methoxyethoxy)silane), sodium lauryl sulphate, boric acid, citric acid, oxalic acid, a cyclic iminoether containing compound, and combinations thereof.

The composition can comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Blue 15:4, Pigment Blue 28, Pigment Green 7, Pigment Yellow 147 and Pigment Yellow 150, or combinations comprising at least one of the foregoing pigments. Pigments can be used in amounts of 0.01 to 10 wt. %, based on the total weight of the composition.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; naphthalenetetracarboxylic acid dyes; porphyrin dyes; bis(styryl) biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinoline-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes can be used in amounts of 0.01 to 10 wt. %, based on the total weight of the polyester-polycarbonate and poly(alkylene ester), where the use of the dyes does not significantly adversely affect the desired properties of the composition.

The composition can further comprise an antioxidant. Suitable antioxidant additives include, for example, organophosphites such as tris(nonyl phenyl)phosphite, tris(2,4-di-t-butylphenyl)phosphite, bis(2,4-di-t-butylphenyl) pentaerythritol diphosphite, distearylpentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)propionic acid with monohydric or polyhydric alcohols; esters of beta-(5-tert-butyl-4-hydroxy-3-methylphenyl)propionic acid with monohydric or polyhydric alcohols; esters of thioalkyl or thioaryl compounds such as distearyl thiopropionate, dilauryl thiopropionate, ditridecyl thiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)propionic acid or the like, or combinations comprising at least one of the foregoing antioxidants. Antioxidants can be used in amounts of 0.0001 to 1 wt. %, based on the total weight of the composition.

Suitable heat stabilizer additives include, for example, organophosphites such as triphenylphosphite, tris-(2,6-dimethylphenyl)phosphite, tris-(mixed mono- and di-nonylphenyl)phosphite or the like; phosphonates such as dimethylbenzene phosphonate or the like, phosphates such as triethylphosphate, or the like, or combinations comprising at least one of the foregoing heat stabilizers. Heat stabilizers can be used in amounts of 0.0001 to 1 wt. %, based on the total weight of the composition.

Light stabilizers and/or ultraviolet light (UV) absorbing additives can also be used. Suitable light stabilizer additives include, for example, benzotriazoles such as 2-(2-hydroxy-5-methylphenyl)benzotriazole, 2-(2-hydroxy-5-tert-octylphenyl)benzotriazole and 2-hydroxy-4-n-octyoxybenzophenone, or the like, or combinations comprising at least one of the foregoing light stabilizers. Light stabilizers can be used in amounts of 0.0001 to 1 wt. %, based on the total weight of the composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing UV absorbers. UV absorbers can be used in amounts of 0.0001 to 1 wt. %, based on the total weight of the composition.

Plasticizers, lubricants, and/or mold release agents additives can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate, the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 wt. %, specifically 0.01 to 0.75 wt. %, more specifically 0.1 to 0.5 wt. %, based on the total weight of the composition.

Inorganic flame retardants can also be used, for example salts of $C_{2-16}$ alkyl sulfonate salts such as potassium perfluorobutane sulfonate (Rimar salt), potassium perfluorooctanesulphonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts can be present in amounts of 0.1 to 5 wt. %, based on the total weight of the composition.

The composition can be manufactured by methods generally available in the art. For example, powdered polycarbonate, polyester, and polyester-polycarbonate copolymer, and other optional additives (including stabilizer packages, e.g., antioxidants, gamma stabilizers, heat stabilizers, ultraviolet light stabilizers, and the like) are first blended, in a HENSCHEL-Mixer® high speed mixer. Other low shear processes such as hand mixing can also accomplish this blending. The blend is then fed into the throat of an extruder via a hopper. Alternatively, one or more of the components can be incorporated into the composition by feeding directly into the extruder at the throat and/or downstream through a sidestuffer. Any desired additives can also be compounded into a masterbatch and combined with the remaining polymeric components at any point in the process. The extruder is generally operated at a temperature higher than that necessary to cause the composition to flow. The extrudate is immediately quenched in a water batch and pelletized. Such pellets can be used for subsequent molding, shaping, or forming.

It has been found that extruded pellets and articles molded from certain of the compositions can be transparent and have excellent optical properties. Thus, in one embodiment, a molded article or an extruded pellet has a total luminous transmittance greater than or equal to 80 percent. In another embodiment, a molded article or an extruded pellet of the composition has a haze value of less than or equal to 5 percent and more specifically less than or equal to 10 percent. Total luminous transmittance and haze are measured on 2.5 millimeter thick molded articles of the composition in accordance with ASTM D1003-00. In one embodiment, a 2.5 millimeter thick molded article of the composition has a total luminous transmittance greater than or equal to 80 percent and a haze value of less than or equal to 5 percent and more specifically less than or equal to 10 percent, measured in accordance with ASTM D1003-00.

Extruded pellets and molded articles comprising the compositions can also be colorless. For example a molded article having a thickness of 3.2 millimeter can have a Yellowness Index of less 4, specifically less than 3, and more specifically less than 2. Yellowness Index is measured in accordance with ASTM D1925 on a Gardner XL-835 colorimeter.

Molded articles comprising the above-described compositions can also meet the criteria for F-1 weathering certification as set forth by Underwriters Laboratories. As such, molded articles of the composition retain, after 1000 hours of ultraviolet light exposure in accordance with ASTM G155, at least 70 percent of their initial tensile or flexural strength, and at least 70 percent of their initial tensile, Izod, or Charpy impact. Strength and impact measurement is performed in accordance with ASTM D638 on injection-molded ASTM type V tensile bars.

Molded articles of the composition can also retain at least 50 percent of their tensile or flexural strength, and at least 50 percent of their tensile, Izod, or Charpy impact, measured in accordance with ASTM D638, after being immersed in water for 7 days at 70° C.

In one embodiment, a molded sample of the composition retains at least 70 percent of its tensile impact strength, measured in accordance with ASTM D638, after 1000 hours of exposure to ultraviolet radiation in accordance with ASTM G155.

In another embodiment, a molded sample of the composition retains at least 50 percent of its tensile impact strength, measured in accordance with ASTM D638, after immersion in water for 7 days at 70° C.

In yet another embodiment, a molded sample of the composition retains at least 70 percent of its tensile impact strength, measured in accordance with ASTM D638, after 1000 hours of exposure to ultraviolet radiation in accordance with ASTM G155, and at least 50 percent of its tensile impact strength, measured in accordance with ASTM D638, after immersion in water for 7 days at 70° C.

Molded articles of the composition can also have improved resistance to caustic solutions. As used herein, a "caustic solution" is an aqueous solution comprising chlorine, bromine, and the like of the type used in pools and spas. Chlorine water has 300 to parts per million chlorine, whereas bromine water has 400 parts per million bromine. Other examples of caustic solutions include BaquaSpa Shock®, Baquacil Algicide®, Baquacil Sanitizer and Algistat®, Baquacil Oxidizer®, Baquacil Waterline Control®, and the like. In one embodiment, when exposed to a caustic solution for 2 days in a constant strain jig with a 0.5 percent strain, a molded article of the composition retains at least 70 percent of its tensile strength, measured in accordance with ASTM D638.

Shaped, formed, or molded articles comprising the compositions are also provided. In one embodiment the article is an extruded, blow molded, or injection molded article. Examples of articles comprising the composition include pool and/or spa components, lenses and lens covers for cellular phones, lenses and lens covers for pools and/or spas, protective sheets, films, fibers, dishware, medical applications, automotive applications, garden equipment, sports and leisure articles, and the like.

It is understood that the scope of the invention can include other embodiments than those described above. In one embodiment, for instance, the polycarbonate component is optional such that the composition, based on the total weight of polymer components in the composition, includes 10 to 80 wt. % of a polyester comprising units of the formula (1)

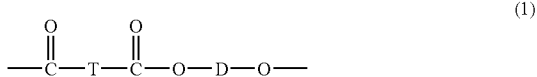

(1)

wherein, as described above, T is a residue derived from a $C_5$-$C_7$ cycloaliphatic or $C_7$-$C_{12}$ aromatic dicarboxylic acid or a chemical equivalent thereof, and D is a residue derived from a $C_6$-$C_{12}$ aromatic or $C_2$-$C_{12}$ aliphatic diol or a chemical equivalent thereof. Within the scope of the above-described T and D groups, specifically, T can be derived from cyclohexanedicarboxylic acid, terephthalic acid, isophthalic acid, a chemical equivalent of the foregoing, or a combination comprising at least one of the foregoing, and D can be derived from 1,4-cyclohexanedimethanol, a $C_{2-4}$ diol, a chemical equivalent of the foregoing, or a combination comprising at least one of the foregoing. Even more specifically, T is derived from terephthalic acid or a chemical equivalent thereof and D is derived from a mixture of 1,4-cyclohexanedimethanol and ethylene glycol or chemical equivalents thereof. Still more specifically, the mixture of 1,4-cyclohexanedimethanol and ethylene glycol or chemical equivalents thereof comprises up to 25 mole percent ethylene glycol.

In this embodiment, the compositions further optionally comprises a polycarbonate, i.e., comprises from 0 to 50 wt. % of a polycarbonate comprising units of the formula (4):

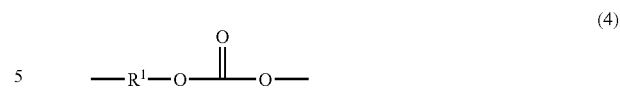

(4)

in which, as described above, at least 60 percent of the total number of $R^1$ groups contain aromatic organic groups and the balance thereof are aliphatic, alicyclic, or aromatic groups. Within the above-described scope of possible $R^1$ groups, $R^1$ in this embodiment can specifically be derived from a compound of the formula (6):

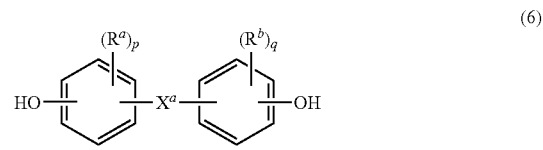

(6)

wherein as described above $R^a$ and $R^b$ are each independently a halogen or a $C_{1-12}$ alkyl, $X^a$ is a single bond, —O—, —S—, —S(O)—, —S(O)$_2$—, —C(O)—, or a $C_{1-18}$ organic group, and p and q are each independently 0 to 4. In a specific embodiment, $X^a$ is a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$) wherein $R^e$ is a divalent $C_{1-12}$ hydrocarbon group, and even more specifically, $X^a$ is isopropylidene and p and q are each zero.

It is also possible in this embodiment for the optional polycarbonate to further comprise units of the formulas (6a) and/or (7a)

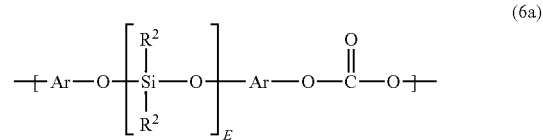

(6a)

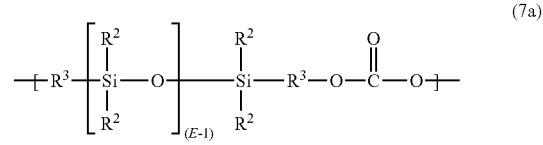

(7a)

wherein each $R^2$ is independently a $C_{1-13}$ monovalent organic group, each Ar is independently a $C_{6-36}$ arylene group wherein the bonds are directly connected to an aromatic moiety, each $R^3$ is independently a divalent $C_{1-30}$ organic group, and E is an integer having an average value of 2 to 1,000. More specifically, each $R^2$ is independently a $C_{1-6}$ monovalent organic group, in particular methyl, each Ar is independently a $C_{6-12}$ arylene group wherein the bonds are directly connected to an aromatic moiety, in particular phenylene, each $R^3$ is independently a divalent $C_{6-12}$ organic group, in particular an alkylenephenylene such as propylenephenylene and E is an integer having an average value of 4 to 500.

When the optional polycarbonate comprises polysiloxane units, the amount of polysiloxane units can be varied to achieve the desired characteristics of the composition, for example low haze. In a specific embodiment, the optional polycarbonate comprises 1 to 20 mole percent of units of formula (7a), specifically units of formula (7a) wherein each $R^2$ is methyl, each $R^3$ is derived from eugenol, and the same or different divalent $C_{1-10}$ organic group, and E is an integer having an average value from 4 to 100.

Further in this embodiment, the composition comprises from 10 to 90 wt. % of at least one polyester-polycarbonate copolymer comprising, based on the total weight of the copolymer, from 15 to 95 wt. % of arylate ester units of the formula (9) as described above:

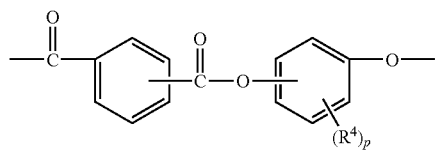

(9)

wherein, as described above, each $R^4$ is independently a halogen or a $C_{1-4}$ alkyl, and p is 0 to 3. The arylate ester units can be derived from the reaction of a mixture of terephthalic acid and isophthalic acid or a chemical equivalent thereof with 5-methylresorcinol, 5-ethylresorcinol, 5-propylresorcinol, 5-butylresorcinol, 5-t-butylresorcinol, 5-phenylresorcinol, 5-cumylresorcinol, 2,4,5,6-tetrafluororesorcinol, 2,4,5,6-tetrabromoresorcinol, catechol, hydroquinone, 2-methylhydroquinone, 2-ethylhydroquinone, 2-propylhydroquinone, 2-butylhydroquinone, 2-t-butylhydroquinone, 2-phenylhydroquinone, 2-cumylhydroquinone, 2,3,5,6-tetramethylhydroquinone, 2,3,5,6-tetra-t-butylhydroquinone, 2,3,5,6-tetrafluorohydroquinone, 2,3,5,6-tetrabromohydroquinone, a chemical equivalent of the foregoing compounds, or a combination comprising at least one of the foregoing compounds.

Further in this embodiment, the at least one polyester-polycarbonate copolymer comprises from 5 to 85 wt. % of aromatic carbonate units of the formula (4):

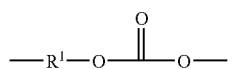

(4)

in which, as described above, at least 60 percent of the total number of $R^1$ groups contain aromatic organic groups and the balance thereof are aliphatic, alicyclic, or aromatic groups. Within the above-described scope of possible $R^1$ groups, $R^1$ in this embodiment can specifically be derived from a compound of the formula (6):

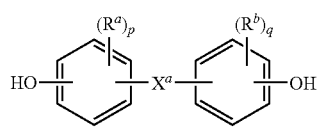

(6)

wherein as described above $R^a$ and $R^b$ are each independently a halogen or a $C_{1-12}$ alkyl, $X^a$ is a single bond, —O—, —S—, —S(O)—, —S(O)$_2$—, —C(O)—, or a $C_{1-18}$ organic group, and p and q are each independently 0 to 4. In a specific embodiment, $X^a$ is a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group, and even more specifically, $X^a$ is isopropylidene and p and q are each zero.

In a specific embodiment, the polyester-polycarbonate copolymer is a poly(isophthalate-terephthalate-resorcinol ester)-co-(bisphenol-A carbonate) polymer comprising repeating structures of formula (10) described above.

Within the range of 10 to 90 wt. %, the amount of the at least one polyester-polycarbonate copolymer can be varied to achieve the desired characteristics of the composition, for example low haze. For example, the at least one polyester-polycarbonate copolymer can be present in an amount of 15 to 60 wt. %, or more specifically 15 to 45 wt. %, based on the total weight of the composition.

The at least one polyester-polycarbonate copolymer of this embodiment can further comprises terminal groups derived from reaction with a phenolic compound the formula (12):

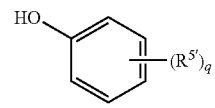

(12)

wherein each $R^5$ is independently halogen, $C_{1-22}$ alkyl, $C_{6-10}$ aryl, $C_{7-22}$ alkylaryl, $C_{7-22}$ arylalkyl, or $C_{1-22}$ alkoxy, and q is 0 to 4. Specifically, the phenolic compound can be phenol, p-cumylphenol, p-tertiary-butylphenol, hydroxydiphenyl, hydroquinone, or p-methoxyphenol.

It has been found advantageous in this embodiment to use two different polyester-polycarbonate copolymers, referred to herein for convenience as a "first" and a "second" polyester-polycarbonate copolymer. The first and second polyester-polycarbonate copolymers differ from each other primarily in the relative ratios of arylate ester units to carbonate units. Thus, the first polyester-polycarbonate copolymer comprises from 10 to 30 wt. %, or from 15 to 25 wt. % of arylate ester units of formula (9) wherein each $R^4$ is independently a halogen or a $C_{1-4}$ alkyl, and p is 0 to 3, and from 70 to 90 wt. %, or from 75 to 85 wt. % of aromatic carbonate units of the formula (4) in which at least 60 percent of the total number of $R^1$ groups contain aromatic organic groups and the balance thereof are aliphatic, alicyclic, or aromatic groups. The second polyester-polycarbonate copolymer comprises from 75 to 95 wt. %, or from 85 to 95 wt. % of arylate ester units of formula (9), wherein each $R^4$ is independently a halogen or a $C_{1-4}$ alkyl, and p is 0 to 3, and from 5 to 25 wt. %, or from 5 to 15 wt. % of carbonate units of formula (4) in which at least 60 percent of the total number of $R^1$ groups contain aromatic organic groups and the balance thereof are aliphatic, alicyclic, or aromatic groups.

As stated above, the composition optionally comprises the polycarbonate, i.e. the composition comprises 0 to 50 wt. % of the polycarbonate, based on the total weight of the composition. Within this range, the amount can be varied to achieve the desired characteristics of the composition, for example low haze. For example, the polycarbonate can be present in an amount of 0 to 40 wt. %, specifically 10 to 40 wt. %, more specifically 20 to 35 wt. %, based on the total weight of the composition. In one embodiment, the composition comprises less than 15 wt. % of the polycarbonate, in another embodiment, the composition comprises less than 10 wt. % of the polycarbonate, more specifically, less than 5 wt. % of the polycarbonate, based on the total weight of the composition. Particularly when the polycarbonate comprises polysiloxane units, the polycarbonate comprises 10 to 40 wt. % of the total weight of the polymer component of the composition. Particularly when two different polyester-polycarbonate copolymers are used, the compositions comprise, based on the total weight of the polymer component, less than 15 wt. % of the polycarbonate polymer, specifically less than 10 wt. % of the polycarbonate polymer, more specifically, less than 5 wt. % of the polycarbonate, and even more specifically no polycarbonate polymer.

In addition to the polyester, optional polycarbonate, and polyester-polycarbonate copolymer(s), the composition can include various other additives ordinarily incorporated with compositions of this type as described above, with the proviso that the additives are selected so as not to significantly adversely affect the desired properties of the composition. Mixtures of additives can be used. Specific additives include an acid interchange quencher, a compound having an epoxy functionality, an antioxidant, a heat stabilizer, a light stabilizer, an ultraviolet light absorber, a plasticizer, a mold release agent, a lubricant, an antistatic agent, a pigment, a dye, a flame retardant, or a combination comprising at least one of the foregoing compounds. Each of the foregoing additives, when present, is used in amounts typical for polyester-polycarbonate blends, for example 0.001 to 5 wt. % of the total weight of the blend, specifically 0.01 to 2 wt. % of the total weight of the blend, except for flame retardants, which are more typically used in amounts of 1 to 10 wt. %, based on the total weight of the composition.

The compositions of this embodiment can further be manufactured by melt-blending the components of the composition as described above. Shaped, formed, or molded articles comprising the compositions are also provided. The compositions can be formed into articles as described above, e.g., by extruding, casting, calendaring, shaping or molding (e.g., or injection molding or blow molding) the compositions to form the articles. The articles can be in the form of a film or a fiber. In still another embodiment, the compositions can be used to form pool and/or spa components, lenses and lens covers for cellular phones, lenses and lens covers for pools and/or spas, protective sheets, films, fibers, dishware, medical applications, automotive applications, garden equipment, sports and leisure articles, and the like.

Advantageously, articles comprising the compositions of this embodiment (where the polycarbonate is present in an amount from 0 to 50 wt. % of the polymer portion of the composition) exhibit highly useful properties. Molded articles can exhibit a haze of less than or equal to 5 percent. An article derived from the composition can exhibit a transparency of greater than or equal to 80%, measured according to ASTM D1003-00. Haze and transparency can be measured on 2.5 millimeter thick molded articles of the composition in accordance with ASTM D1003-00.

An article derived from the composition can have a Yellowness Index of less than 2, measured in accordance with ASTM D 1925. For example a molded article having a thickness of 3.2 millimeter can have a Yellowness Index of less 4, specifically less than 3, and more specifically less than 2. Yellowness Index is measured in accordance with ASTM D1925 on a Gardner XL-835 calorimeter.

Molded articles comprising the above-described compositions can also meet the criteria for F-1 weathering certification as set forth by Underwriters Laboratories. As such, molded articles of the composition retain, after 1000 hours of ultraviolet light exposure in accordance with ASTM G155, at least 70 percent of their initial tensile or flexural strength, and at least 70 percent of their initial tensile, Izod, or Charpy impact. Strength and impact measurement is performed in accordance with ASTM D638 on injection-molded ASTM type V tensile bars.

Molded articles of the composition can also retain at least 50 percent of their tensile or flexural strength, and at least 50 percent of their tensile, Izod, or Charpy impact, measured in accordance with ASTM D638, after being immersed in water for 7 days at 70° C.

Molded articles of the composition can also have improved resistance to caustic solutions. As used herein, a "caustic solution" is an aqueous solution comprising chlorine, bromine, and the like of the type used pools and spas. Chlorine water has 300 to parts per million chlorine, whereas bromine water has 400 parts per million bromine. Other examples of caustic solutions include BaquaSpa Shock®, Baquacil Algicide®, Baquacil Sanitizer and Algistat®, Baquacil Oxidizer®, Baquacil Waterline Control®, and the like. In one embodiment, when exposed to a caustic solution for 2 days in a constant strain jig with a 0.5 percent strain, a molded article of the composition retains at least 70 percent of its tensile strength, measured in accordance with ASTM D638.

In another specific embodiment, a composition comprises a polyester comprising poly (20 mol % ethylene terephthalate)-co-(80 mol % 1,4-cyclohexanedimethyleneterephthalate) in an amount of 15 to 85 wt. % of the composition, a polycarbonate comprising poly(bisphenol-A carbonate) in an amount of 10 to 85 wt. % of the composition, and a polyester-polycarbonate copolymer comprising poly(90 wt. % isophthalate-terephthalate-resorcinol)-co-(10 wt. % bisphenol-A carbonate) copolymer in an amount of 0 to 4 wt. % of the composition. A molded article comprising the composition has a haze of less than or equal to 10% and a total luminous transmittance of greater than 70% in accordance with ASTM D1003-00.

In still another specific embodiment the composition comprises a polyester comprising poly(1,4-cyclohexanedimethyleneterephthalate) in an amount of 50 to 70 wt. % of the composition, a polycarbonate comprising poly(bisphenol-A carbonate) in an amount of 10 to 40 wt. % of the composition, and a polyester-polycarbonate copolymer comprising poly (90 wt. % isophthalate-terephthalate-resorcinol)-co-(10 wt. % bisphenol-A carbonate) copolymer in an amount of 10 to 40 wt. % of the composition. A molded article comprising the composition has a haze of less than or equal to 10% and a total luminous transmittance of greater than 70% in accordance with ASTM D1003-00.

The invention is further illustrated by the following non-limiting examples.

EXAMPLES

Compositions for the examples and comparative examples were prepared using the components shown in Table 1.

TABLE 1

| Component | Description | Trade name, Source |
|---|---|---|
| PC High Flow | Bisphenol A polycarbonate resin ($M_w$ = 22,000 g/mol, PS standards) | LEXAN ®, GE Plastics |
| LEXAN ®, PC 105 | Bisphenol A polycarbonate resin ($M_w$ = 30,000 g/mol, PS standards) | LEXAN ®, GE Plastics |
| PC 131 | Bisphenol A polycarbonate resin ($M_w$ = 36,000 g/mol, PS standards) | LEXAN ®, GE Plastics |
| PC | Bisphenol A polycarbonate resin ($M_w$ = 60,000 g/mol, PS standards) | GE Plastics |
| PCCD | Poly(1,4-cyclohexanedimethylene 1,4-cyclohexane dicarboxylate) | Eastman Chemical |
| PCT | Poly(1,4-cyclohexanedimethylene terephthalate) ($M_w$ = 70,000 g/mol, PS standards) | Eastman Chemical |
| 20:80 ITR-PC | Poly(20 wt % isophthalate-terephthalate-resorcinol ester)-co-(80 wt % bisphenol-A carbonate) copolymer ($M_w$ = 60,000 g/mol, PS standards) | GE Plastics |
| 90:10 ITR-PC | Poly(90 wt. % isophthalate-terephthalate-resorcinol)-co-(10 wt. % bisphenol-A carbonate) copolymer ($M_w$ = 40,000 g/mol, PS standards) | GE Plastics |
| PETG | Poly(70 mol % ethylene terephthalate)-co-(30 mol % 1,4-cyclohexanedimethylene terephthalate) ($M_w$ = 70,000 g/mol, PS standards) | Eastman Chemical |
| P.T. | Pentaerythritol tetrastearate | Lonza, Inc. |
| P-EPQ | Tetrakis(2,4-di-tert-butylphenyl)-4,4'-biphenylene diphosphonite | Sandostab P-EPQ, Clariant |
| AO1010 | Pentaerythritol tetrakis(3,5-di-tert-butyl-4-hydroxyhydrocinnamate) | Irganox 1010, Ciba Specialty Chemicals |
| UV5411 | 2-(2'-Hydroxy-5'-octylphenyl)-benzotriazole | Cyasorb UV-5411, Cytec Indus. |
| UV3638 | 2,2'-(1,4-Phenylene)bis(4H-3,1-benzoxazin-4-one) | Cyasorb UV-3638, Cytec Indus. |
| Tinuvin 234 | 2-(2'-Hydroxy-3,5-dicumyl)benzotriazole | Everlight USA Inc. |
| Tinuvin 1577 | 2-(4,6-Diphenyl-1,3,5-triazin-2-yl)-5-hexyloxyphenol | Ciba Specialty Chemicals |
| Tinuvin 350 | 2-(2H-benzo[d][1,2,3]triazol-2-yl)-6-sec-butyl-4-tert-butylphenol | Ciba Specialty Chemicals |
| Uvinul 5050H | Sterically hindered amine oligomer | BASF |
| Uvinul 3030 | 1,3-bis-[2'-cyano-3',3-diphenylacryloyl)oxy]-2,2-bis-{[2-cyano-3',3'-diphenylacryloyl)oxy]methyl}propane | BASF |
| R7260 | Pigment Blue 60 | BASF |
| R03509 | Alpha-stabilized copper phthalocyanine pigment | Heliogen Blue K6911D, BASF |
| R72 | 1,8-bis-(p-toluidino)-9,10-anthraquinone | Nagase America Corp. |
| P.A. | Phosphoric Acid, pre-diluted to 10% | Lab Chem, Inc. |
| ADR4368 | Styrene-acrylate copolymer with glycidyl groups | BASF |
| PCTG | Poly(ethylene terephthalate)-co-(1,4-cyclohexanedimethylene terephthalate) (20 mol % ethylene units and 80 mol % 1,4-cyclohexanedimethylene units ($M_w$ = 70,000 using polystyrene standards) | Eastman Chemical Co. |
| PC 100 | Bisphenol polycarbonate LEXAN ® resin. ($M_n$ = 29,000 Daltons, GPC against polystyrene standards) | General Electric Company |
| Clear EXL | Core-shell acrylic impact modifier | Rohm and Haas |

General Procedure for Preparation of Poly(isophthalate-terephthalate-resorcinol ester)-co-(bisphenol-A carbonate) (ITR-PC).

Each of the ITR-PC copolymers used herein was prepared according to the following general procedure. A 30 liter round bottom reactor equipped with a mechanical stirrer, pH electrode, condenser, and two addition tubes connected to metering pumps was charged with resorcinol (12.5 to 25 mole percent excess relative to the total moles of diacid chloride), water (to provide 34 to 35 wt. % salts following preparation of the hydroxy-terminated polyester), methylene chloride (6 liters), and triethylamine (2 mole percent). The mixture was stirred with a 6-inch impeller at 300-350 rpm. One addition tube was connected to a solution consisting of a 50/50 mixture of isophthaloyl and terephthaloyl chloride and enough methylene chloride to make an approximately 35 wt. % diacid chloride solution. The other addition tube was connected to a 50 wt. % aqueous sodium hydroxide solution. Over the course of 10 minutes, the diacid chloride solution containing 3.42 moles isophthaloyl dichloride and 3.42 moles terephthaloyl dichloride, and 85 to 95 mol % of the NaOH solution (based on diacid chloride) were added at constant molar flow rates to the reactor. Upon completion of the acid chloride addition, a further amount of NaOH solution was added to the reactor over 3 minutes in order to adjust the pH to approximately 8.25, and the mixture was allowed to stir for roughly 10 minutes. After formation of the resulting hydroxy-terminated polyesters (HTPE) was complete, phenol (3.4 mol % based on total bisphenol-A), bisphenol-A, water and methylene chloride were added to the mixture. The amount of bisphenol-A added was based upon the formula:

Moles bisphenol-A added=6.84 moles diacid chloride× ((mol % PC)/(mol % ITR)) wherein, for example, a polymer with a desired composition of 20 mol % carbonate units and 80 mol % ester units (i.e., 80:20 ITR-PC), uses an amount of bisphenol-A=(6.84 mole×(20/80)=6.84×0.25=1.71 moles bisphenol-A.

Before phosgenation, sufficient additional water was added to dissolve all of the salt (NaCl) present in the reaction mixture at the end of formation of the hydroxy-terminated polyester intermediate. Additional methylene chloride was introduced to provide a concentration of solids in the organic phase at the end of phosgenation of 11 to 17 wt. %.

The mixture comprising the hydroxy-terminated polyester, free phenol, free excess resorcinol, bisphenol-A, methylene chloride, salt, and triethylamine (TEA) was then phosgenated in the same reactor used to prepare the hydroxy-terminated polyester intermediate. 1.4 equivalents (based on the total moles of free bisphenol-A) of phosgene and 50 wt. % NaOH solution were then introduced at a constant rate over a period of 55 minutes while maintaining a pH of pH 8.5 until 60 mol % of the stoichiometric amount of phosgene had been added (60 mol % bisphenol conversion). The pH was adjusted 9.5 and the remaining phosgene was added. Upon completion of phosgene addition the reaction mixture was stirred for several minutes. The methylene chloride solution containing the product polyester-polycarbonate was separated from the brine layer and washed twice with 1N HCl, and four times with deionized water. The volumes of the aqueous washes were roughly equal to the volume of the product polymer solution. The product was isolated by injection of steam into a well-agitated mixture of hot water and the methylene chloride solution of the product polyester-polycarbonate. The product was isolated as a white powder was filtered and dried for 24 hours at 80 to 100° C. The product polyester-polycarbonate was characterized by GPC ($M_w$, polystyrene molecular weight standards). The analytical results were consistent with the formation of block polyester-polycarbonates. NMR indicated that the product polyester-polycarbonate was fully endcapped as shown by the absence of free terminal hydroxyl groups (undetectable by NMR) and acid end-groups (also undetectable by NMR).

Examples 1-17 and Comparative Examples 1-16

The compositions were prepared by compounding on a Werner and Pfleiderer 27 millimeter twin screw extruder with a vacuum vented mixing screws at 271° C. and 300 rpm at a rate of 50 pounds per hour. The extrudate was cooled through a water bath before pelletizing. The pellets were dried for 3-4 hours at 77° C. in a forced air circulating oven and injection molded on a Van Dorn 80T molding apparatus at 293° C.

Polymer molecular weight was determined by gel permeation chromatography using a crosslinked styrene-divinylbenzene gel column, a sample concentration of 1 milligram per milliliter, calibrated using polycarbonate or polystyrene standards as indicated.

Haze and total luminous transmittance (% T) were each measured on 2.5 millimeter (mm) plaques in accordance with ASTM D1003-00.

Yellowness Index was measured in accordance with ASTM D1925 on a Gardner XL-835 calorimeter using 3.2 mm thick plaques.

Melt volume rate (MVR) was measured in accordance with ISO 1133 using 2.16 kg samples at 265° C. or 1.2 kg at 300° C., with a 240 second dwell time, and using an orifice having a diameter of 0.0825 inch. The samples were dried for 60 minutes at 100° C. MVR is reported in cubic centimeters per 10 minutes ($cm^3/10$ min).

Impact values were measured on 3.2 mm thick bars in accordance with ASTM D 256. The results of the test are reported in terms of energy absorbed per unit of specimen width, and expressed in Joule/meter (J/m). Typically, the final test result was calculated as the average of test results of five test bars.

Dynatup (also known as multi-axial impact) test is based on the ASTM D3763 method. This test provides information on how a material behaves under multiaxial deformation conditions. The deformation applied is a high speed puncture. Reported as the test results are ductility, expressed in percent (%) and impact energy, expressed in Joules (J). The final test result was calculated as the average of the test results of typically five test plaques.

Melt viscosity is based on the ASTM D1238 method, using an extrusion plastometer equipped with an automatic timer on a Tinius Olson MP 987. Before testing, the samples were dried for one hour at 150° C. The testing conditions are a melt temperature of 266° C., a total load of 5,000 grams, an orifice diameter of 0.0825 inch, and a dwell time of 5 minutes. The test result is expressed in the unit Poise.

Flexural Modulus is based on the ASTM D790 method. Typical test bars have the following dimensions: ⅛ inch×½ inch×2½ inch). The final test result was calculated as the average of test results of five test bars. The test involves a three point loading system utilizing center loading on a simply supported beam. Instron and Zwick are typical examples of manufacturers of instruments designed to perform this type of test. The flexural modulus is the ratio, within the elastic limit, of stress to corresponding strain and is expressed in Megapascals (MPa).

Tensile Strength is based on the ASTM D638 method. Test bars in the form of the standard dumbbell shape are used in this test method. The final test result is calculated as the average of the test results of five test bars. The tensile strength is calculated by dividing the maximum load observed in the test by the original minimum cross-sectional area of the test specimen. The result is expressed in Megapascals (MPa). Instron and Zwick are typical examples of manufacturers of instruments designed to perform this type of test.

Tensile Elongation is the ability of a material to resist breaking under tensile stress is based upon ASTM D638. Samples were injection molded. The tensile testing machine pulls the sample from both ends and measures the force required to pull the specimen apart and how much the sample stretches before breaking. The ultimate elongation of a plastic is the percentage increase in length that occurs before it breaks under tension.

All amounts in the following tables are in weight percent, based on the total weight of the composition.

Comparative Examples 1-2

Table 2 lists the components of comparative examples 1 and 2. Table A lists the retention properties of comparative examples 1 and 2 after exposure to 1000 hours of ultraviolet radiation in accordance with ASTM G155, and after 7 days of water immersion at 70° C.

TABLE 2

| Component | C1 | C2 |
|---|---|---|
| PC 131 | — | 50.0 |
| LEXAN PC 105 | 29.8 | — |
| PC HIGH FLOW | 10.00 | 24.0 |
| PCT | — | 24.9 |
| PCCD | 59.8 | — |
| P.T. | — | 0.30 |
| P.A. | — | 0.075 |
| ADR4368 | — | 0.25 |
| UV5411 | 0.25 | 0.25 |
| P-EPQ | 0.15 | 0.15 |
| Monozinc phosphate | 0.05 | — |
| AO1010 | 0.00 | 0.12 |
| Colorant 1 | 0.000079 | 0.000195 |
| Colorant 2 | 0.000051 | 0.000113 |

TABLE A

| | % Retention for C1 | | % Retention for C2 | |
|---|---|---|---|---|
| Exposure Type | Tensile Impact | Tensile Strength | Ten. Impact | Ten. Strength |
| ASTM G155 | 48 | 105 | 45 | 102 |
| Water Immersion | 18 | 106 | 72 | 108 |

As can be seen from table A, comparative examples 1 and 2 did not meet the Underwriters Laboratories standards for F-1 certification, i.e., the retentions are not equal to or greater than 70 percent.

Comparative Examples 3-9

Table 3 lists the components of comparative examples 3-9, which include radiation stabilizers and absorbers. Table B lists the retention properties of comparative examples 3-9 after exposure to 250, 500, and 1000 hours of ultraviolet radiation in accordance with ASTM G155.

TABLE B

| | Percent retention of Tensile Impact | | |
|---|---|---|---|
| | 250 Hours | 500 Hrs | 1000 Hrs |
| C3 | 63 | 61 | 9 |
| C4 | 55 | 51 | 13 |
| C5 | 58 | 57 | 12 |
| C6 | 53 | 52 | 12 |
| C7 | 50 | 55 | 18 |
| C8 | 41 | 44 | 42 |
| C9 | 50 | 50 | 42 |

It can be seen from table B that comparative examples 3-9 did not meet the Underwriters Laboratories standards for F-1 certification, i.e., the retentions are not equal to or greater than 70 percent.

Examples 1-5, Comparative Examples 10-12

Table 4 lists the components of examples 1-5 in accordance with the invention and comparative examples 10-12. Table C lists their retention properties after exposure to 200, 400, 600, 800, and 1000 hours of ultraviolet radiation in accordance with ASTM G155.

TABLE 3

| | C3 | C4 | C5 | C6 | C7 | C8 | C9 |
|---|---|---|---|---|---|---|---|
| PC High Flow | 24.15 | 24.03 | 24.03 | 23.96 | 24.03 | 24.03 | 24.03 |
| PC 131 | 50.00 | 50.00 | 50.00 | 50.00 | 50.00 | 50.00 | 50.00 |
| PCT | 25.00 | 24.88 | 24.88 | 24.80 | 24.83 | 24.88 | 24.88 |
| P.T. | 0.30 | 0.30 | 0.30 | 0.30 | 0.30 | 0.30 | 0.30 |
| P-EPQ | 0.10 | 0.10 | 0.10 | 0.10 | 0.10 | 0.10 | 0.10 |
| AO1010 | 0.12 | 0.12 | 0.12 | 0.12 | 0.12 | 0.12 | 0.12 |
| P.A. | 0.075 | 0.075 | 0.075 | 0.075 | 0.075 | 0.075 | 0.075 |
| ADR4368 | 0.25 | 0.25 | 0.25 | 0.25 | 0.25 | 0.25 | 0.25 |
| UV5411 | — | 0.25 | — | — | — | — | — |
| Tinuvin 234 | — | — | 0.25 | — | — | — | — |
| Uvinul 5050 H | — | — | — | 0.1 | — | — | — |
| Tinuvin 1577 | — | — | — | 0.3 | — | — | — |
| UV3638 | — | — | — | — | 0.3 | — | — |
| Tinuvin 350 | — | — | — | — | — | 0.25 | — |
| Uvinul 3030 | — | — | — | — | — | — | 0.25 |
| R72 | 0.000195 | 0.000195 | 0.000195 | 0.000195 | 0.000195 | 0.000195 | 0.000195 |
| R7260 | 0.000113 | 0.000113 | 0.000113 | 0.000113 | 0.000113 | 0.000113 | 0.000113 |

TABLE 4

|  | C10 | E1 | E2 | C11 | E3 | C12 | E4 | E5 |
|---|---|---|---|---|---|---|---|---|
| PCTG | — | — | — | — | — | 26.3 | 26.3 | 26.3 |
| PCCD | — | — | — | 59.73 | 59.73 | — | — | — |
| PCT | 24.78 | 24.78 | 24.78 | — | — | — | — | — |
| PC 131 | 50.00 | — | — | — | — | — | — | — |
| PC High Flow | 24.03 | — | — | 15.0 | — | 62.0 | — | — |
| PC 100 | — | — | — | 24.3 | — | 11.0 | — | — |
| 20:80 ITR-PC | — | 74.1 | — | — | 39.3 | — | 73.0 | — |
| 90:10 ITR-PC | — | — | 74.1 | — | — | — | — | 73.0 |
| P.T. | 0.30 | 0.30 | 0.30 | 0.27 | 0.27 | 0.30 | 0.30 | 0.30 |
| P-EPQ | 0.15 | 0.15 | 0.15 | 0.15 | 0.15 | 0.1 | 0.1 | 0.1 |
| P.A. | 0.075 | 0.075 | 0.075 | 0.05 | 0.05 | 0.05 | 0.05 | 0.05 |
| ADR4368 | 0.25 | 0.25 | 0.25 | 0.25 | 0.25 | 0.25 | 0.25 | 0.25 |
| UV5411 | 0.25 | 0.25 | 0.25 | 0.25 | 0.25 | — | — | — |
| AO1010 | 0.12 | 0.12 | 0.12 | — | — | — | — | — |
| Pigment 1 | 0.000113 | 0.000113 | 0.000113 | 0.000113 | 0.000113 | 0.000113 | 0.000113 | 0.000113 |
| Pigment 2 | 0.000028 | 0.000028 | 0.000028 | 0.000028 | 0.000028 | 0.000028 | 0.000028 | 0.000028 |

TABLE C

| | % Retention of Tensile Impact | | | | |
|---|---|---|---|---|---|
| Sample | 200 Hrs | 400 Hrs | 600 Hrs | 800 Hrs | 1000 Hrs |
| C10 | 53 | 96 | 90 | 81 | 48 |
| E1 | 78 | 53 | 78 | 87 | 93 |
| E2 | 91 | 98 | 88 | 101 | 99 |
| C11 | 86 | 78 | 90 | 84 | 21 |
| E3 | 106 | 85 | 93 | 65 | 73 |
| C12 | 12 | 49 | 29 | 10 | 11 |
| E4 | 75 | 90 | 68 | 92 | 97 |
| E5 | 99 | 94 | 94 | 103 | 98 |

It can be seen from table C that comparative examples 10-12 did not meet the Underwriters Laboratories standards for F-1 certification, i.e., the retention of tensile impact is not equal to or greater than 70 percent after 1000 hours of ultraviolet exposure, whereas inventive examples 1-5 do meet the standards.

Examples 6-10 and Comparative Example 13

Table 5 lists the components of inventive examples 6-10 and comparative example 13. Table D lists their retention properties after exposure to 500 and 1000 hours of ultraviolet radiation in accordance with ASTM G155, and after immersion in water for 7 days at 70° C.

TABLE D

| | % Retention of Tensile Impact | | |
|---|---|---|---|
| Sample | 500 hrs | 1000 Hrs | Water Immersion |
| C13 | 51 | 49 | 84 |
| E6 | 72 | 72 | 87 |
| E7 | 79 | 70 | 89 |
| E8 | 75 | 73 | 89 |
| E9 | 81 | 75 | 55 |
| E10 | 73 | 72 | 69 |

Table D shows that comparative example 13 did not meet the standards for F-1 certification, (retention of tensile impact is not equal to or greater than 70 percent after 1000 hours of ultraviolet exposure), versus inventive examples 6-10.

Examples 11-16 and Comparative Example 14

Table 6 lists the components of inventive examples 11-16 and comparative example 14. Properties are shown in Table E.

TABLE 5

|  | C13 | E6 | E7 | E8 | E9 | E10 |
|---|---|---|---|---|---|---|
| PC 131 | 49.42 | 22.76 | 9.42 | — | 22.77 | 9.44 |
| PC High Flow | 24.71 | 11.38 | 4.71 | — | 11.39 | 4.72 |
| 20:80 ITR-PC | — | 40 | 60 | 74.14 | 40 | 60 |
| PCT | 24.78 | 24.78 | 24.78 | 24.78 | — | — |
| PCTG | — | — | — | — | 24.78 | 24.78 |
| P.T. | 0.300 | 0.300 | 0.300 | 0.300 | 0.300 | 0.300 |
| P-EPQ | 0.09 | 0.09 | 0.09 | 0.09 | 0.09 | 0.09 |
| P.A. | 0.075 | 0.075 | 0.075 | 0.075 | 0.050 | 0.050 |
| ADR4368 | 0.250 | 0.250 | 0.250 | 0.250 | 0.250 | 0.250 |
| UV5411 | 0.250 | 0.250 | 0.250 | 0.250 | 0.250 | 0.250 |
| AO1010 | 0.120 | 0.120 | 0.120 | 0.120 | 0.120 | 0.120 |
| Colorant 1 | 0.00044 | 0.00044 | 0.00044 | 0.00044 | 0.00044 | 0.00044 |
| Colorant 2 | 0.00012 | 0.00012 | 0.00012 | 0.00012 | 0.00012 | 0.00012 |

TABLE 6

|  | C14 | E11 | E12 | E13 | E14 | E15 | E16 |
|---|---|---|---|---|---|---|---|
| PC 131 | 49.42 | 22.76 | 9.42 | — | 53.93 | 9.44 | 53.93 |
| PC High Flow | 24.71 | 11.38 | 4.71 | — | — | 4.72 | — |
| 20:80 ITR-PC | — | 40 | 60 | 74.14 | — | 60 | — |
| PCT | 24.78 | 24.78 | 24.78 | 24.78 | 20 | — | — |
| PCTG | — | — | — | — | — | 24.78 | 20 |
| Clear EXL | — | — | — | — | 25 | — | 25 |
| P.T. | 0.3 | 0.3 | 0.3 | 0.3 | 0.3 | 0.3 | 0.3 |
| P-EPQ | 0.09 | 0.09 | 0.09 | 0.09 | 0.09 | 0.09 | 0.09 |
| P.A. | 0.075 | 0.075 | 0.075 | 0.075 | 0.075 | 0.05 | 0.05 |
| ADR4368 | 0.25 | 0.25 | 0.25 | 0.25 | 0.25 | 0.25 | 0.25 |
| UV5411 | 0.25 | 0.25 | 0.25 | 0.25 | 0.25 | 0.25 | 0.25 |
| AO1010 | 0.12 | 0.12 | 0.12 | 0.12 | 0.12 | 0.12 | 0.12 |
| Colorant 1 | 0.00044 | 0.00044 | 0.00044 | 0.00044 | 0.00044 | 0.00044 | 0.00044 |
| Colorant 2 | 0.00012 | 0.00012 | 0.00012 | 0.00012 | 0.00012 | 0.00012 | 0.00012 |

TABLE E

|  | C14 | E11 | E12 | E13 | E14 | E15 | E16 |
|---|---|---|---|---|---|---|---|
| MVR, 300° C. (cm$^3$/10 min) | 11.9 | 12.8 | 14.1 | 15.2 | 8.7 | — | — |
| MVR, 265° C. | — | — | — | — | — | 6.0 | 4.1 |
| Specific gravity | 1.2 | 1.22 | 1.21 | 1.22 | 1.19 | 1.21 | 1.19 |
| Flexural modulus (MPa) | 2270 | 2340 | 2300 | 2300 | 2250 | 2370 | 2340 |
| Flexural Stress at 5% strain (MPa) | 87.8 | 90.8 | 89.8 | 89.6 | 87.1 | 90.6 | 89.7 |
| Flexural stress at yield | 97.6 | 99.6 | 98.4 | 98.4 | 95 | 97.8 | 97.2 |
| Heat deflection temperature (° C.) | 109 | 103 | 105 | 104 | 110 | 104 | 111 |
| Notched Izod ductility at 23° C. (%) | 100 | 100 | 100 | 100 | 100 | 100 | 100 |
| Notched Izod impact strength at 23° C. (J/m) | 981 | 845 | 974 | 928 | 1050 | 988 | 1150 |
| Notched Izod ductility at 0° C. (%) | 40 | 20 | 0 | 20 | 100 | 0 | 100 |
| Notched Izod impact strength at 0° C. (J/m) | 480 | 317 | 138 | 325 | 1040 | 175 | 1030 |
| Multi axial impact ductility at 23° C. (%) | 100 | 100 | 100 | 100 | 100 | 100 | 100 |
| Notched Izod impact total energy at 23° C. (J) | 75.8 | 71.7 | 68.7 | 69.1 | 83.3 | 89.1 | 91.5 |
| Multi axial impact ductility at 0° C. (%) | 100 | 100 | 100 | 100 | 100 | 100 | 100 |
| Notched Izod impact total energy at 0° C. (J) | 78 | 73.1 | 66.3 | 59.3 | 71.3 | 76.4 | 80.5 |
| Tensile modulus (MPa) | 2240 | 2200 | 2000 | 2100 | 2070 | 2310 | 2300 |
| Tensile stress at yield (MPa) | 60.8 | 62.3 | 61.5 | 61.6 | 59.9 | 61.8 | 60.8 |
| Tensile stress at break (MPa) | 62 | 58.1 | 66.3 | 69.4 | 62.4 | 66.4 | 60.9 |
| Tensile elongation at yield (%) | 6.2 | 6.1 | 6.6 | 6.3 | 6.3 | 6 | 5.9 |
| Tensile elongation at break (%) | 110 | 97 | 130 | 140 | 110 | 130 | 110 |
| Yellowness Index | 1.3 | 0.3 | 0.8 | 0.8 | 5.9 | −0.1 | 5.6 |
| Total luminous transmittance (%) | 77.8 | 82.4 | 83.3 | 83.1 | 81.8 | 81.1 | 79.8 |
| Haze (%) | 1.6 | 2.2 | 1.5 | 1.8 | 2.6 | 1.8 | 2.7 |

The data in table E shows that comparative example 14 displayed the poorest qualities, especially in melt volume rate, flexural modulus, flexural stress, and tensile stress. It is important to note that comparative example 14 did not have a total luminous transmittance greater than or equal to 80 percent. On the other hand, inventive examples 11-16 all display a total luminous transmittance greater than or equal to 80 percent, and a haze value less than 5 percent, while maintaining excellent mechanical properties.

Property Retention of Example 9 and Comparative Examples 15-17

Example 9 and comparative examples 15-17 were further subjected to immersion in caustic solutions for 2 days in a constant strain jig with a 0.5 percent strain. Table 7 lists their retention of mechanical properties by comparing their elongation at break, measured in accordance with ASTM D638. Comparative Example 15 (C15) is PC HIGH FLOW. Comparative Example 16 (C16) is LEXAN 105. Comparative Example 17 (C17) is PC 131.

TABLE 7

|  | BaquaSpa Shock® | Bromine water | Baquacil Algicide® | Baquacil Sanitizer & Algistat® | Baquacil Oxidizer® | Baquacil Waterline Control® |
|---|---|---|---|---|---|---|
| C15 | 74 | 74 | 77 | 68 | 75 | 72 |
| C16 | 70 | 72 | 67 | 67 | 75 | 68 |
| C17 | 73 | 73 | 69 | 66 | 73 | 71 |
| E9 | 89 | 92 | 88 | 84 | 93 | 86 |

It can be seen from table 7 that inventive example 9 displayed the highest elongation value, with its lowest being 84 percent elongation after immersion in Baquacil Sanitizer and Algistat®. The best retention out of the comparative examples was 77 percent elongation after immersion in Baquacil Algicide®.

Examples 17-27 and Comparative Examples 18-52

In these examples, the compositions were compounded on a Werner and Pfleiderer 28 millimeter twin screw extruder with a vacuum vented mixing screw, barrel and die head temperatures between 240° C. and 265° C., and 150 to 300 rpm screw speed. The extruder has eight independent feeders and could be operated at a maximum rate of 30 kilograms per hour. The extrudate was cooled through a water bath before pelletizing. Articles for testing were injection molded on a van Dorn molding machine with a temperature of 240° C. to 265° C. The pellets were dried for 3 to 4 hours at 60° C.-120° C. in a forced air circulating oven before injection molding.

Haze and total luminous transmittance (% T) were measured as described above.

All amounts in the following tables are in weight percent, based on the total weight of the composition.

Examples 17-24 and Comparative examples 18-34

Table 8 shows the optical properties of ternary compositions comprising a polyester-polycarbonate copolymer (ITR-PC), a polyester (PCTG), and a polycarbonate, and, for comparison purposes, (i) binary blends containing (a) PCTG and a polyester-polycarbonate copolymer, or (b) PCTG and a polycarbonate, and (ii) ternary blends having different amounts of the components.

TABLE 8

| | Component | | | Optical Properties | |
|---|---|---|---|---|---|
| No. | PC | 90:10 ITR-PC | PCTG | Transmission (%) | Haze (%) |
| C18 | 30 | 30 | 40 | 71.4 | 16.8 |
| E17 | 25 | 25 | 50 | 83.6 | 4.2 |
| E18 | 15 | 35 | 50 | 83.3 | 7.2 |
| E19 | 35 | 15 | 50 | 87.8 | 1.4 |
| C19 | 15 | 0 | 85 | 88.6 | 2.1 |
| C20 | 85 | 0 | 15 | 89.8 | 1.1 |
| E20 | 15 | 15 | 70 | 88.9 | 1.3 |
| E21 | 10 | 40 | 50 | 84.7 | 8.8 |
| C21 | 40 | 40 | 20 | 37.9 | 68.3 |
| E22 | 50 | 10 | 40 | 87.4 | 1.7 |
| C22 | 10 | 50 | 40 | 75.4 | 24.1 |
| C23 | 10 | 60 | 30 | 64.5 | 43.6 |
| C24 | 10 | 70 | 20 | 53.7 | 68.2 |
| C25 | 10 | 80 | 10 | 46 | 82.2 |
| E23 | 10 | 30 | 60 | 88.2 | 2.2 |
| E24 | 60 | 10 | 30 | 82.7 | 3.8 |
| C26 | 50 | 20 | 30 | 67.7 | 15.3 |
| C27 | 40 | 20 | 40 | 76.8 | 8.1 |

TABLE 8-continued

| | Component | | | Optical Properties | |
|---|---|---|---|---|---|
| No. | PC | 90:10 ITR-PC | PCTG | Transmission (%) | Haze (%) |
| C28 | 70 | 10 | 20 | 74.1 | 12.4 |
| C29 | 80 | 10 | 10 | 64.4 | 28.4 |
| C30 | 50 | 0 | 50 | 90.1 | 1.1 |
| C31 | 0 | 50 | 50 | 90 | 0.9 |
| C32 | 50 | 50 | 0 | 26.4 | 86 |
| C33 | 0 | 85 | 15 | 90 | 2 |
| C34 | 0 | 15 | 85 | 90 | 1.6 |

It can be seen from Table 8 that when at least 30 wt % of PCTG is present in the composition, a molded article comprising the composition and having a thickness of 2.5 millimeters has a haze of less than or equal to 10 percent, measured in accordance with ASTM D1003-00. It is also evident from the data above that when at least 40 wt % of PCTG is present in the composition, a molded article comprising the composition and having a thickness of 2.5 millimeters has a total luminous transmittance of greater than or equal to 80 percent, measured in accordance with ASTM D1003-00.

Examples 25-27 and Comparative Examples 35-52

Table 9 shows the optical properties of ternary compositions comprising a polyester-polycarbonate copolymer (ITR-PC), a polyester (PCT), and polycarbonate, and for comparison purposes (i) binary blends containing (a) PCT and polyester-polycarbonate copolymer, or (b) PCT and polycarbonate, and (ii) ternary blends having different amounts of the ITR-PC, PCT, and polycarbonate.

TABLE 9

| | Component | | | Optical Properties | |
|---|---|---|---|---|---|
| No. | PC | 90:10 ITR-PC | PCT | Transmission (%) | Haze (%) |
| C35 | 30 | 30 | 40 | 46.9 | 82.6 |
| C36 | 25 | 25 | 50 | 72.4 | 13.1 |
| C37 | 0 | 85 | 15 | 88.3 | 1.5 |
| C38 | 85 | 0 | 15 | 87.8 | 3.6 |
| E25 | 15 | 15 | 70 | 89.3 | 1 |
| C39 | 45 | 15 | 40 | 73.9 | 16.4 |
| C40 | 15 | 45 | 40 | 70.8 | 37.9 |
| E26 | 40 | 10 | 50 | 87.1 | 1.9 |
| E27 | 10 | 40 | 50 | 86.2 | 7.4 |
| C41 | 50 | 10 | 40 | 79.6 | 8.8 |
| C42 | 10 | 50 | 40 | 73 | 28.8 |
| C43 | 60 | 10 | 30 | 70.6 | 19.2 |
| C44 | 10 | 60 | 30 | 61.7 | 50.5 |
| C45 | 80 | 10 | 10 | 58 | 43.6 |
| C46 | 10 | 80 | 10 | 43.9 | 94.1 |
| C47 | 90 | 10 | 0 | 51.4 | 62.7 |
| C48 | 10 | 90 | 0 | 38.9 | 103 |
| C49 | 40 | 40 | 20 | 33.2 | 81.8 |
| C50 | 50 | 50 | 0 | 17.5 | 105 |

TABLE 9-continued

| | Component | | | Optical Properties | |
|---|---|---|---|---|---|
| No. | PC | 90:10 ITR-PC | PCT | Transmission (%) | Haze (%) |
| C51 | 50 | 0 | 50 | 90 | 1.8 |
| C52 | 0 | 50 | 50 | 90.4 | 1.4 |

It can be seen from Table 9 that a certain amount of PCT provides transparent ternary blend. Based on the data, it is evident that at least 40 wt % of PCT provides a composition wherein a molded article comprising the composition and having a thickness of 2.5 millimeters has a haze of less than or equal to 10 percent, measured in accordance with ASTM D1003-00. It is also evident from the data that when at least 50 wt % of PCT is present in the composition, a molded article comprising the composition and having a thickness of 2.5 millimeters has a total luminous transmittance of greater than or equal to 80 percent, measured in accordance with ASTM D1003-00.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition, based on the total weight of polymer components in the composition, comprising a transparent blend of:

(a) from 10 to 80 wt. % of a polyester comprising units of the formula

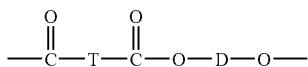

wherein T is a residue derived from cyclohexanedicarboxylic acid, terephthalic acid, isophthalic acid, a chemical equivalent of the foregoing, or a combination thereof, and D is a residue derived from a $C_6$-$C_{12}$ aromatic or $C_2$-$C_{12}$ aliphatic diol or chemical equivalent;

(b) from more than 0 to 60 wt. % of a polycarbonate comprising units of the formula

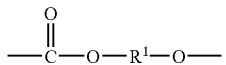

wherein each $R^1$ is independently a divalent organic radical, and at least about 60% of the organic radicals are aromatic; and (c) from 10 to 90 wt. % of at least one polyester-polycarbonate copolymer comprising, based on the total weight of the copolymer, from 15 to 95 wt. % of arylate ester units of the formula

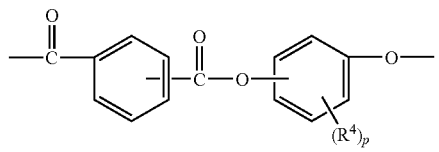

wherein each $R^4$ is independently halogen or $C_{1-4}$ alkyl and p is 0 to 3, and from 5 to 85 wt. % of aromatic carbonate units of the formula

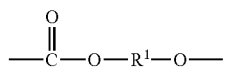

wherein each $R^1$ is independently a divalent organic radical, and at least about 60% of the organic radicals are aromatic, and further wherein the polyester-polycarbonate copolymer comprises terminal groups derived from reaction with a phenolic compound the formula

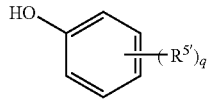

wherein each $R^{5'}$ is independently halogen, $C_{1-22}$ alkyl, $C_{6-10}$ aryl, $C_{7-22}$ alkylaryl, $C_{7-22}$ arylalkyl, or $C_{1-22}$ alkoxy, and q is 0 to 4.

2. The composition of claim 1, wherein an extruded pellet comprising the composition is transparent.

3. The composition of claim 2, wherein the extruded pellet is colorless.

4. The composition of claim 1, further comprising a quencher.

5. The composition of claim 4, wherein the quencher is selected from the group consisting of zinc phosphate, monozinc phosphate, phosphorous acid, phosphoric acid diluted in water, sodium acid pyrophosphate, tetrapropylorthosilicate, tetrakis-(2-methoxyethoxy)silane), sodium lauryl sulphate, boric acid, citric acid, oxalic acid, a cyclic iminoether containing compound, and combinations thereof.

6. The composition of claim 1, wherein a molded article derived from the composition and having a thickness of 2.5 millimeters has a haze of less than or equal to 10 percent, measured in accordance with ASTM D 1003-00.

7. The composition of claim 1, wherein a molded article derived from the composition and having a thickness of 2.5 millimeters has a total luminous transmittance of greater than or equal to 80 percent, measured in accordance with ASTM D1003-00.

8. The composition of claim 1, wherein D is derived from a member selected from the group consisting of 1,4-cyclohexanedimethanol, $C_{2-4}$ diols, chemical equivalents of the foregoing diols, and combinations thereof.

9. The composition of claim 1, wherein T is derived from cyclohexanedicarboxylic acid or a chemical equivalent thereof and D is derived from 1,4-cyclohexanedimethanol or a chemical equivalent thereof.

10. The composition of claim 1, wherein T is derived from terephthalic acid or a chemical equivalent thereof and D is derived from a mixture of 1,4-cyclohexanedimethanol and ethylene glycol or chemical equivalents thereof.

11. The composition of claim 10, wherein the mixture of 1,4-cyclohexanedimethanol and ethylene glycol or chemical equivalents thereof comprises up to 25 mole percent ethylene glycol.

12. The composition of claim 1, wherein $R^1$ in the polycarbonate is derived from a compound of the formula

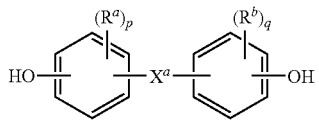

wherein $R^a$ and $R^b$ are each independently a halogen or a $C_{1-12}$ alkyl, $X^a$ is a singlebond, —O—, —S—, —S(O)—, —S(O)$_2$—, —C(O)—, or a $C_{1-18}$ organic group, and p and q are each independently 0 to 4.

13. The composition of claim 12, wherein $X^a$ is a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group.

14. The composition of claim 13, wherein $X^a$ is isopropylidene and p and q are each zero.

15. The composition of claim 1, wherein the polycarbonate further comprises units of the formulas

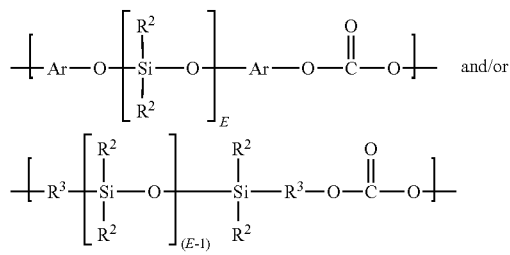

wherein each $R^2$ is independently a $C_{1-13}$ monovalent organic group, each Ar is independently a $C_{6-36}$ arylene group wherein the bonds are directly connected to an aromatic moiety, each $R^3$ is independently a divalent $C_{1-30}$ organic group, and E is an integer having an average value of 2 to 1,000.

16. The composition of claim 1, wherein the composition comprises 10 to 40 wt. % of the polycarbonate.

17. The composition of claim 1, wherein the composition comprises more than 0 and less than 15 wt. % polycarbonate.

18. The composition of claim 1, wherein the composition comprises more than 0 and less than 5 wt. % polycarbonate.

19. The composition of claim 1, wherein the arylate ester units are derived from the reaction of a mixture of terephthalic acid and isophthalic acid or a chemical equivalent thereof with 5-methylresorcinol, 5-ethylresorcinol, 5-propylresorcinol, 5-butylresorcinol, 5-t-butylresorcinol, 5-phenylresorcinol, 5-cumylresorcinol, 2,4,5,6-tetrafluororesorcinol, 2,4,5,6-tetrabromoresorcinol, catechol, hydroquinone, 2-methylhydroquinone, 2-ethylhydroquinone, 2-propylhydroquinone, 2-butylhydroquinone, 2-t-butylhydroquinone, 2-phenylhydroquinone, 2-cumylhydroquinone, 2,3,5,6-tetramethylhydroquinone, 2,3,5,6-tetra-t-butylhydroquinone, 2,3,5,6-tetrafluorohydroquinone, 2,3,5,6-tetrabromohydroquinone, a chemical equivalent of the foregoing compounds, or a combination comprising at least one of the foregoing compounds.

20. The composition of claim 1, wherein $R^1$ in the polyester-polycarbonate copolymer is derived from a compound of the formula

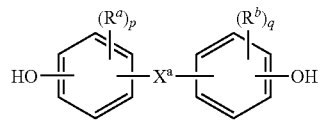

wherein $R^a$ and $R^b$ are each independently a halogen or a $C_{1-12}$ alkyl, $X^a$ is a single bond, —O—, —S—, —S(O)—, —S(O)$_2$—, —C(O)—, or a $C_{1-18}$ organic group, and p and q are each independently 0 to 4.

21. The composition of claim 20, wherein $X^a$ is a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group.

22. The composition of claim 21, wherein $X^a$ is isopropylidene and p and q Are each zero.

23. The composition of claim 1, wherein the phenolic compound is phenol, p-cumylphenol, p-tertiary-butylphenol, hydroxydiphenyl, hydroquinone, p-methoxyphenol, or a combination comprising at least one of the foregoing phenolic compounds.

24. The composition of claim 1, further comprising an acid interchange quencher, a compound having an epoxy functionality, an antioxidant, a heat stabilizer, a light stabilizer, an ultraviolet light absorber, a plasticizer, a mold release agent, a lubricant, an antistatic agent, a pigment, a dye, a flame retardant, or a combination comprising at least one of the foregoing compounds.

25. A method of manufacture of the composition of claim 1, comprising melt blending the components of the composition of claim 1.

26. An article comprising the composition of claim 1.

27. The article of claim 26, wherein the article is an extruded, blow molded, or an injection molded article.

28. The article of claim 26, in the form of a film.

29. The article of claim 26, in the form of a fiber.

30. The article of claim 26, in the form of a lens or a lens cover for a pool and/or spa.

31. A method of forming an article, comprising shaping, extruding, blow molding, or injection molding the composition of claim 1 to form the article.

32. A composition comprising, based on the total weight of polymer components in the composition, a transparent blend of:
   (a) from 40 to 80 wt. % of poly(1,4-cyclohexanedimethylene terephthalate)-co-poly(ethylene terephthalate), wherein greater than 50 mol % of the ester groups are 1,4-cyclohexanedimethylene terephthalate groups;
   (b) from more than 0 to 60 wt. % of a polycarbonate comprising units derived from Bisphenol A; and
   (c) from 10 to 60 wt. % of at least one polyester-polycarbonate copolymer comprising, based on the total weight of the copolymer, from 85 to 95 wt. % of arylate ester units of the formula

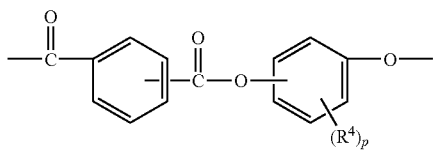

wherein p is 0, and
from to 15 wt. % of aromatic carbonate units derived from Bisphenol A, and further wherein
the polyester-polycarbonate copolymer comprises terminal groups derived from reaction with a phenolic compound the formula

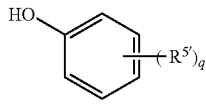

wherein each $R^5$ is independently halogen, $C_{1-22}$ alkyl, $C_{6-10}$ aryl, $C_{7-22}$ alkylaryl, $C_{7-22}$ arylalkyl, or $C_{1-22}$ alkoxy, and q is 0 to 4,
wherein a molded article comprising the composition has a haze of less than or equal to 10% and a total luminous transmittance of greater than 80% in accordance with ASTM D1003-00.

33. An article comprising the composition of claim 32.

34. The article of claim 33, wherein the article is an extruded, blow molded, or an injection molded article.

35. The article of claim 33, in the form of a film.

36. A composition comprising, based on the total weight of polymer components in the composition, a transparent blend of:
(a) from 50 to 80 wt. % of poly(1,4-cyclohexanedimethylene terephthalate)
(b) from more than 0 to 60 wt. % of a polycarbonate comprising units derived from Bisphenol A; and
(c) from 10 to 50 wt. % of at least one polyester-polycarbonate copolymer comprising, based on the total weight of the copolymer,
from 85 to 95 wt. % of arylate ester units of the formula

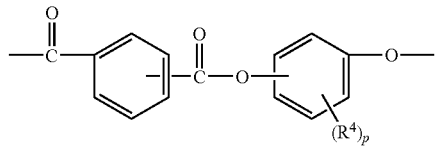

wherein p is 0, and
from to 15 wt. % of aromatic carbonate units derived from Bisphenol A, and further wherein
the polyester-polycarbonate copolymer comprises terminal groups derived from reaction with a phenolic compound the formula

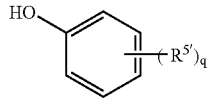

wherein each $R^{5'}$ is independently halogen, $C_{1-22}$ alkyl, $C_{6-10}$ aryl, $C_{7-22}$ alkylaryl, $C_{7-22}$ arylalkyl, or $C_{1-22}$ alkoxy, and q is 0 to 4,
wherein a molded article comprising the composition has a haze of less than or equal to 10% and a total luminous transmittance of greater than 80% in accordance with ASTM D1003-00.

37. An article comprising the composition of claim 36.

38. The article of claim 37, wherein the article is an extruded, blow molded, or an injection molded article.

39. The article of claim 37, in the form of a film.

* * * * *